(12) United States Patent
Cheng

(10) Patent No.: US 6,396,509 B1
(45) Date of Patent: *May 28, 2002

(54) ATTENTION-BASED INTERACTION IN A VIRTUAL ENVIRONMENT

(75) Inventor: Doreen Yining Cheng, Los Altos, CA (US)

(73) Assignee: Koninklijke Philips Electronics N.V., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 09/027,461

(22) Filed: Feb. 21, 1998

(51) Int. Cl.$^7$ ................................................. G06F 3/00
(52) U.S. Cl. ...................... 345/706; 345/757; 345/848; 345/419
(58) Field of Search ................................ 345/330, 331, 345/329, 355, 419, 706, 757, 751, 753, 848, 850, 851

(56) References Cited

U.S. PATENT DOCUMENTS

| | | | | |
|---|---|---|---|---|
| 5,736,982 A | * | 4/1998 | Suzuki et al. | 345/330 |
| 5,884,029 A | * | 3/1999 | Brush II et al. | 709/202 |
| 5,907,328 A | * | 5/1999 | Brush II et al. | 345/358 |
| 5,923,330 A | * | 7/1999 | Tarlton et al. | 345/419 |
| 6,147,674 A | * | 11/2000 | Rosenberg et al. | 345/157 |
| 6,154,211 A | * | 11/2000 | Kamachi et al. | 345/419 |
| 6,219,045 B1 | * | 4/2001 | Leahy et al. | 345/331 |

* cited by examiner

Primary Examiner—Kristine L. Kincaid
Assistant Examiner—Sy D. Luu
(74) Attorney, Agent, or Firm—Harold Tsiang

(57) ABSTRACT

A system enabling participants in a virtual environment to select a partner for an interaction session, the system comprising attention and priority components. The attention component employs attention sense and focus spaces. The sense space comprises a sense cone, the sense cone being both contained by a sense sphere and having a sense vector along its axis. The focus space comprises a focus cone, the focus cone being both contained by a focus sphere and having a focus vector along its axis. The attention component is associated with one or more senses, each such sense having associated therewith respective sense and focus spaces. The attention component is configured to support either/both intentional interaction (interaction driven by defined explicit controls) and spontaneous interaction (interaction driven by non-intentional encounters, e.g., spontaneous "eye" contact between avatars). The priority component determines priorities for avatars and objects, such that highest priority avatars/objects have (a) enhanced rendering and (b) increased quality of service from networks and operating systems. The priority component is responsive to selected parameters, including, for example, one or more of (i) objects' relative positions, (ii) the direction, orientation and span of sense and focus spaces, (iii) participants' profiles, (iv) predetermined parameters, as set by developers and/or participants, (v) social parameters, (vi) economic models and (vii) combinations of these and other selected parameters. In some embodiments, the system employs only the attention component. In other embodiments, the system employs both the attention and the priority components.

17 Claims, 6 Drawing Sheets

ATTENTION-BASED INTERACTION IN A VIRTUAL ENVIRONMENT

RELATED APPLICATION

U.S. patent application of Doreen Y. Cheng, Ser. No. 09/027,459, now U.S. Pat. No. 6,329,986, filed concurrently herewith and entitled PRIORITY-BASED VIRTUAL ENVIRONMENT, is herein incorporated by reference.

BACKGROUND OF THE INVENTION

This invention relates to a system, apparatus and method for enabling a participant to interact in a virtual environment and, particularly, a system, apparatus and method for enabling a participant to engage in attention-based interaction in a virtual environment.

The high-volume, consumer electronics market segment is progressing toward the integration of computer-based advances and traditional audio/video products. Among the computer-based advances, networking systems (e.g., the Internet) offer new opportunities in diverse fields, including entertainment, education, information search, and social interaction. Traditional audio and video offers ease of use and consumer comfort and acceptance in the home, particularly the family room.

One approach to this integration would rely on virtual environments. Virtual environments comprise computer-generated, generally three-dimensional representations of a real, physical setting or scene. The setting/scene can be a city, a mall, an individual store, a building, a suite of offices, an individual office or some other space. The representations can be more or less realistic both in terms of their rendering of the real world and in terms of the human senses that are supported.

In any case, a virtual environment generally comprises virtual objects, the objects typically including entities that are animate or inanimate. Inanimate entities may include features of the environment, such as, for example, walls of a virtual office that are always inanimate walls in the office. Animate entities may include so-called avatars and bots. Bots, broadly, are images that, generally, operate autonomously from the participants, performing predetermined tasks or providing features within the environment. A bot can include, for example, a wall that transforms to deliver incoming messages. An avatar, by comparison, generally is an image that represents, and is controlled by, a participant. An avatar, typically supports one or more of body gestures, facial expressions, speech and motion.

However configured, a virtual environment generally beckons its participants to become immersed in the sensory experience it provides. To do so, the participants interact with the environment's objects. As an example, social interaction between participants is conducted by interaction among such participants' avatars, the interaction occurring, e.g., as the avatars' paths converge during a stroll in a virtual park. As another example, a participant can direct their avatar to interact with a bot so that, from the interaction, participant obtains certain desired information. In both such examples, a participant generally interacts through their avatar.

The quality of the participant's experience depends, broadly, on the quality of interaction supported by the environment. In that regard, studies of existing virtual environments have indicated that the quality of social interaction between participants is a dominant factor in determining whether participants are stimulated to repeatedly visit a virtual environment. The studies have also shown that the quality of social interactions depends on support, in avatars, of facial expressions, as well as other body language, generally associated with face-to-face encounters in the real world Notwithstanding the studies' findings, however, current virtual environments either fail to support or inadequately support social interaction between participants. To improve the quality of social interaction supported, several challenges are to be met. One such challenge is enabling natural, socially-acceptable protocols for sessions of interaction. Such protocols should allow participants to feel and/or to become socially comfortable in the virtual environment. Generally, however, conventional virtual environments fail to support such protocols. As an example, conventional virtual environments tend to over-emphasize a participant's ability to command attention from another participant, which protocol is neither sufficiently natural nor adequately socially-acceptable. As another example, conventional virtual environments tend to inadequately support pair-wise conversation in group-social settings (e.g. parties). In these setting, when conversation is via text (i.e., chat), messages typically are displayed in a fixed portion of the display screen as issued by one or more participants. When conversation is via audio, plural participants may be talking concurrently, and all at substantially the same volume. Accordingly, in both cases, the tide of messages from all sources tends to be confusing. Moreover, a particular message from a desirable source may be lost to a participant awaiting its arrival, e.g., the message may pass before the participant recognizes it.

In addition to enabling adequate protocols, another challenge to the support of social interaction in virtual environments is management of resource loading. Particularly with communication and rendering of multimedia data, conventional virtual environments tend to overload and/or inadequately allocate resources. Such overloading and misallocation, in turn, generally impedes support of social interaction via multimedia, e.g. via speech, music, environmental sound, facial and gesture animation, and/or video.

Accordingly, a need exists, in the context of virtual environments, for a system that overcomes the shortcomings of conventional virtual environment technologies, particularly as to social interaction, individually and together with rendering and data communication.

SUMMARY OF THE INVENTION

An object of this invention is to provide a virtual environment that overcomes the shortcomings associated with social interaction.

Another object of this invention is to provide a system implementing attention-based social interaction among objects in a virtual environment, while also supporting priority-based rendering and data communication in that virtual environment.

According to one aspect of the invention, a system is provided that enables participants in a virtual environment to easily select a partner and to have an interaction session with the selected partner though respective objects, e.g., avatars. The system comprises an avatar attention component. The avatar attention component is attention based in that it employs an attention sense space and an attention focus space. The sense space comprises a sense cone, the sense cone being both contained by a sense sphere and having a sense vector along its axis. The attention focus space comprises a focus cone, the focus cone being both contained by a focus sphere and having a focus vector along its axis.

In one embodiment, the attention component is associated with avatar sight. The attention sense space is a scanning space that comprises a vision cone, the vision cone being both contained by a vision sphere and having a vision vector along its axis. The attention focus space is a gaze space that comprises a gaze cone, the gaze cone being both contained by a focus sphere and having a gaze vector along its axis.

In another embodiment, the attention component is associated with a non-sight sense, e.g., hearing. In yet another embodiment, plural attention sense spaces are provided, e.g., one associated with sight and another associated with a non-sight sense, such as hearing. In this latter case, each sense preferably has associated therewith respective sense and focus spaces.

The avatar attention component preferably is configured to support intentional interactions (interactions driven by defined explicit controls) and spontaneous interactions (interactions driven by non-intentional encounters, e.g., spontaneous "eye" contact between avatars), both individually and together. Spontaneous interaction can arise, among other conditions, when two objects are in each other's respective focus spaces. The avatar attention component preferably employs the sense and focus spaces, particularly the cones and vectors thereof, so as to enable computations associated with attention to be relatively fast. The avatar attention component preferably employs an interaction control engine so as to enable enhanced handling of dynamicism of objects in the environment, e.g., position change and attention drift of an interacting avatar, as well as interruptions from non-interacting objects.

The system also preferably comprises a priority component. The priority component determines priorities for avatars and objects, such that highest priority avatars/objects have (a) enhanced rendering (e.g., enhancement of resolution, frame rate, colors and/or other qualities) as to the senses and dimensions supported by the system and (b) increased quality of service from networks and operating systems. The priority component preferably is responsive to selected parameters, including, for example, one or more of (i) objects' relative positions, (ii) the direction, orientation and span of sense and focus spaces, (iii) participants' profiles, (iv) parameters set by developers and/or participants, (v) social parameters, (vi) economic models and (vii) combinations of these and other selected parameters. As a consequence of priority assignments, rendering not only is reduced in overall complexity (e.g., reduced system loading associated with computation and communication of multimedia data), but also can be integrated with social factors, including factors related to interaction.

In some embodiments, the system employs only the attention component. In other embodiments, the system employs both the attention and the priority components.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

BRIEF DESCRIPTION OF THE DRAWINGS

The drawings, all according to the present invention, include.

DETAILED DESCRIPTION

Terminology

Figure 1A:
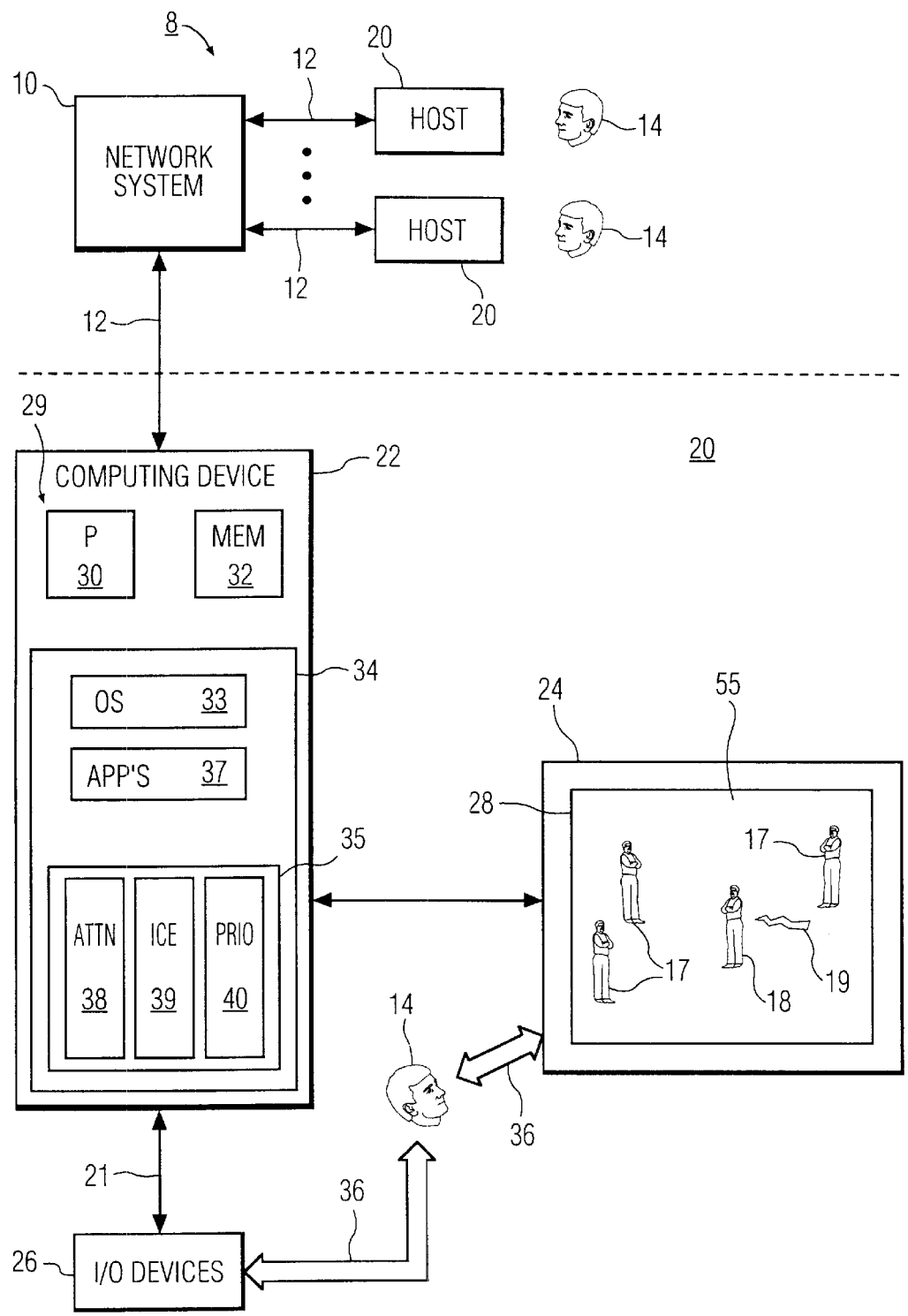
FIG. 1a showing a block diagram of a virtual environment system, including a priority component and an attention component, according to the principles of the invention.

Virtual environment system, as used herein, refers to any individual or plural, central or distributed, computing-based system capable of supporting a virtual world or other virtual environment, or settings/scenes thereof, particularly any such environment characterized by avatars, bots and other virtual objects.

Virtual object (or, sometimes, object alone) is any thing or part of the virtual environment, whether animate, inanimate or combinations thereof. Inanimate virtual objects may include features of the environment, e.g., inanimate walls in a virtual office. Animate virtual objects may include avatars and bots.

Avatar, as used herein, refers to a virtual object that represents, and is controlled by, a participant. An avatar typically supports, e.g., one or more of body gestures, facial expressions, speech and motion. An avatar, while so representing and supporting, can be other than anthropomorphic and can comprise a combination of both animate and inanimate virtual objects.

Non-avatar object, as used herein, refers to a virtual object that does not represent a participant. Typically, non-avatar objects can operate autonomously from the participants, supporting predetermined senses (e.g., analogous to avatar sight), having predetermined functions (e.g., provide information), performing predetermined tasks (e.g., collect information) or providing features (e.g., image of a tree) of the environment. It is to be recognized that a non-avatar object can be a component of an avatar. As an example, a non-avatar object can include a wall that, in interaction with an avatar, either remains a wall or animates to deliver message directed to the interacting avatar. As another example, a non-avatar object can include an appendage or other part of a first avatar that, when triggered by a second avatar, provides to the second avatar selected information, such as personal information of the participant associated with the first avatar.

Intentional interaction, as used herein, refers to those interactions in the virtual environment that are governed by predetermined, explicit controls facilitating interaction, such controls being actively selected by a participant. These interactions are generally analogous to real-world "tapping on the shoulder" to obtain attention. In the virtual environment, then, intentional interaction—in a broad sense—is one object affirmatively soliciting the attention of another object.

Spontaneous interaction, as used herein, refers to those interactions in the virtual environment that are governed by objects' encountering one another as to any one sense or combination of senses, the encounter triggering interaction through a predetermined, automatic mechanism, and generally without use of explicit controls.

Interaction session, as used herein, refers to any state wherein one object is interacting with another object in the virtual environment. An object is engaged in an interaction session when it is initiating, has established, is conducting, and/or is terminating interaction with another object (sometimes referred to herein as being "engaged" with another object). An object is not engaged in an interaction session when it is sensing, but not involved with another object (see the base state of FIG. 8).

Overview

As shown in FIG. 1a, a virtual environment system 8, as contemplated by this invention, comprises a network system 10 to and/or through which are coupled, via communication channels 12, one or more hosts 20. Each of the hosts 20 has associated therewith a participant 14 who interacts with the virtual environment via the respective station 20.

The network system 10 comprises a selected topology. An example topology of the system 10 includes a star network having a centralized computing system to which all the hosts 20 are connected. This example topology provides: (i) the centralized computing system runs server software that administers the virtual environment (e.g., receiving from and transmitting to participants 14 data concerning interaction, motion and other selected features and behaviors of virtual objects); (ii) the hosts 20 run client software that controls the local virtual experience, including obtaining and transmitting data to the server respecting its participant's interaction with and in the environment ("interaction data") and multimedia data (such as images, sound, and or text) responsive to received data; and (iii) the server software controls the distribution of data, including interaction data received from each host 20, among all hosts 20. It is understood that the centralized computing system can comprise a host 20.

Another example topology employs direct connections among hosts 20, wherein (i) typical connections rely on protocols such as transmission control protocol (TCP) and/ or user datagram protocol (UDP), (ii) server/client software is essentially distributed among each of the hosts 20 and (iii) each host's software sends its participant's interaction data to relevant other hosts 20. Yet another example topology employs direct connections wherein, rather than communicating interaction data among all participants one by one, a participant communicates their data to a selected group address (i.e., multicasting) such that each host 20 of a particular group address can choose whether to accept/reject the data. It is to be recognized that other topologies can be employed without departing from the principles of the invention, including, for example, topologies that combine one or more features of the above topologies.

A host 20 according to the present invention, comprises a computing device 22 coupled, via connections 21, to each of one or more display devices 24 and one or more input/output (I/O) devices 26. The connections 21 typically comprise wire/cabling, but, in the case of one or more of the I/O devices 26 and display devices 24, the connections can be implemented using a wireless technology (e.g., infrared technology).

Other than by observing the virtual environment 16 (see FIG. 1b) through the display device 24, the participant 14 interacts with the environment 16 through interaction connections 36. The interaction connections 36 provide a human-machine-type link between the participant and the I/O devices 26 and/or the display device 24.

Each display device 24 has a screen 28, the screen imaging the environment 16, particularly setting/scenes thereof. In one embodiment, as shown, the screen 28 images the participant's avatar 18, other avatars 17 and a non-avatar object 19 (e.g., a lightning bolt seeking to shock the avatar 18).

Although the system 8, as depicted, provides a third person view of the environment, it is to be recognized that the system 8 can provide either/both third and first person views, without departing from the principles of the invention. That is, system preferably is implemented so that the virtual environment is presented to its participant either in first person or third person view: (i) first person view provides for experiencing and interacting in the virtual environment effectively as if the participant is the avatar (e.g., as if the participant sees the environment effectively through the avatar's eyes) and (ii) third person view provides for experiencing and interacting in the virtual environment separate from the avatar (e.g., as if seeing the environment through a camera mounted at a view point effectively above the avatar and, in that regard, enabled to observe the avatar in the environment). It is also preferred, however, that the participant is enabled to experience and interact with the virtual environment, at any point in time, through only one view (the "control view").

A preferred display device 24 comprises a head-mounted display (HMD) equipped with spatial disposition technology (i.e., to detect head and/or eye motions relative to, e.g., the displayed virtual environment 16). However, it is to be understood that other types of display devices 24 can be used without departing from the principles of the invention (e.g., a single or an array of monitors).

The I/O devices 26 preferably include one or more data acquisition devices that provide data representative of the participant's interaction with and in the virtual environment. In that regard, the I/O devices 26 preferably are responsive to the movements of the participant's body parts or sense-based socialization. It is to be recognized that the devices can include one or more of a keyboard, a microphone, audio speakers, olfactory generators/detectors, pointing devices (e.g., a mouse, trackball, touch pad, and/or a joystick), steering devices (e.g., steering wheel or bar, bicycle frame, virtual skis and/or skates), movement sensors, facial gesture detecting devices, virtual reality gloves, haptic suits and/or other haptic attire, as well as other data acquisition devices, alone or in combination, without departing from the principles of the invention.

The computing device 22 typically includes a general purpose computer 29 having a processor 30, a memory system 32 (e.g., volatile memory and/or nonvolatile mass memory) and supporting software 34. The software 34 preferably includes an operating system ("OS") 33, a virtual environment package 35 (e.g., either client, client/host or other software associated with the topology of the environment), and some number of other application programs 37. The OS 33 preferably supports multimedia, e.g., through a graphical user interface (GUI). The OS 33 typically comprises a collection of component programs. The OS component programs generally include (i) device drivers associated with the respective I/O devices 26 and (ii) display device drivers associated with the display devices 24.

It is to be understood that the invention admits a broad range of OS architectures. In that regard, no particular commercial OS, or architectural characteristics thereof, are preferred for implementing this invention. Moreover, it is to be recognized that any implemented OS can be other than as described above, without departing from the principles of the invention. As an example, the OS 33 can omit, combine or re-arrange various device drivers, with or without adding new components.

Although the system 8 is depicted to have plural hosts 20, each comprising a computing device, and each implemented in association with but separate from the network system 10, it is to be recognized that other implementations can be used without departing from the principles of the invention. As an example, in one embodiment, the system 8 comprises a single host 20 used by one or more participants via one or more display devices 24, wherein the host 20 provides the network system 10.

Figure 1B:
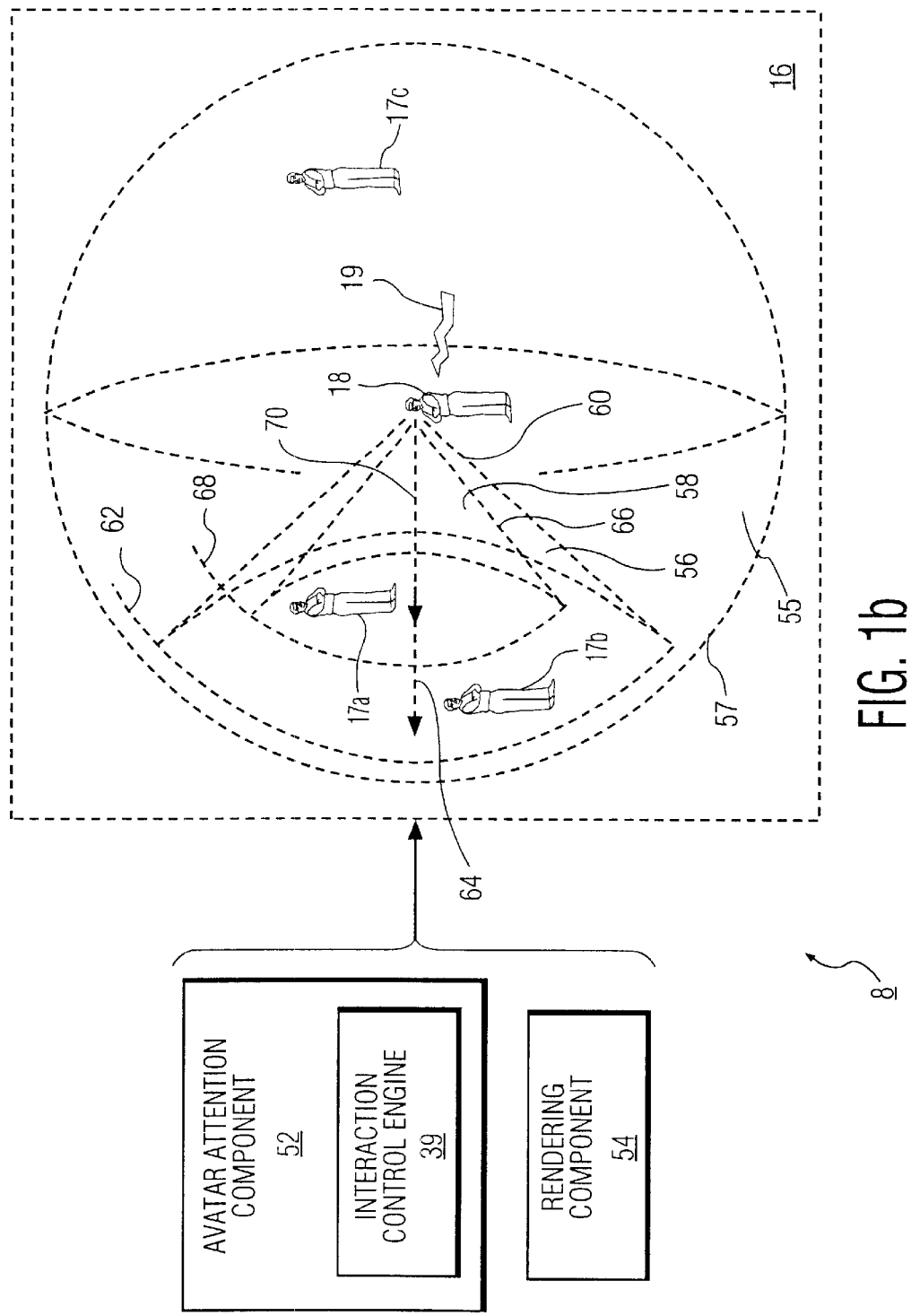
FIG. 1b showing a block diagram of a virtual environment system, showing attention sense and focus spaces of the attention component, according to the principles of the invention.

A virtual environment system 8, as illustrated in FIG. 1b, comprises an avatar attention component 52 and a priority component 54. In one embodiment: (a) the avatar attention component 52 comprises an attention module 38 and an interaction control engine 39, both of the virtual environment package 35, together with associated hardware (whether disposed in one or more hosts 20 and/or the network system 10) and software (e.g., the implicated portions of the OS 33, other applications 37, and any other software of one or more hosts 20 and/or the network system 10) and (b) the priority component 54 comprises a priority module 40 of the virtual environment package 35, together with associated hardware (whether disposed in one or more hosts 20 and/or the network system 10) and software (e.g., the implicated portions of the OS 33, other applications 37, and any other software of one or more hosts 20 and/or the network system 10). In other embodiments, however, either or both of the attention component 52 and the priority component 54 can be implemented in the absence of one or more of the respective modules 38, 39, 40 and/or other software.

The avatar attention component 52 is attention based in that it employs one or more attention spaces 55, each such space 55 comprising an attention sense space 56 and an attention focus space 58. The attention sense space 56 preferably comprises a sense volume (e.g., a sense sphere 62) and a sense volume section (e.g., a sense cone 60). As illustrated, the sense cone 60 is contained by the sense sphere 62 and has a sense vector 64. The attention focus space 58 preferably comprises a focus volume (e.g., a focus sphere 68) and a focus volume section (e.g., a focus cone 66). As illustrated, the focus cone 66 is contained by the focus sphere 68 and has a focus vector 70. Preferably, the focus cone 66 is also contained by the sense cone 60. (Sense and focus spheres are sometimes referred to herein individually or collectively as "attention spheres"; sense and focus cones are sometimes referred to herein individually or collectively as "attention cones"; and sense and focus vectors are sometimes referred to herein individually or collectively as "attention vectors".)

The attention component 52 is associated with one or more senses. (Examples of typical senses include sight and hearing.) As to a particular sense, the attention component has an attention space. That space's sense space 56 preferably is used to control the objects that the participant/avatar is enabled to perceive (e.g., via rendering) within the environment. In turn, that space's focus space 58 preferably is used to determine the prospective partners (e.g., avatars and/or other virtual objects) with which the participant's avatar is enabled to interact spontaneously (e.g., through focus). In that interaction, the prospective partners preferably are those avatars and other objects that are perceivable via the sense space 56 and resident in the focus space 58. In FIG. 1b, avatars 17a–c are all within the attention space 55 of avatar 18, but (i) only avatars 17a and 17b are in the attention sense space 56 of avatar 18 and (ii) only avatar 17a is also in the attention focus space 58 of avatar 18. (As described further hereinafter, the two spaces also preferably contribute to priority-based rendering of avatars and other virtual objects.)

Accordingly, the avatar attention component 52 contemplates employing a plurality of spaces. A first space is the virtual environment, within which space is perceivable, as to each supported sense, none, some or all of the environment's resident avatars and other virtual objects. Other spaces include the respective attention spaces, each of which spaces, preferably, is associated with a respective one of the supported senses. The attention spaces preferably are individually selectable (i.e., by sense), both in size and disposition relative to the virtual environment's space. Moreover, the attention spaces preferably comprise, as stated, the sense and focus spaces which spaces are of selected, preferably dynamic, orientation within the attention space and have selected dimensional number (e.g., two-dimensional, three-dimensional, etc.).

Attention Component

The discussion that follows describes the avatar attention component as respects the sense of sight. It is to be recognized that other senses generally are supported by the attention component, such support being similar to the details that follow for sight. (Throughout the remainder of this document, vectors are represented by underscored labels.)

Figure 2:
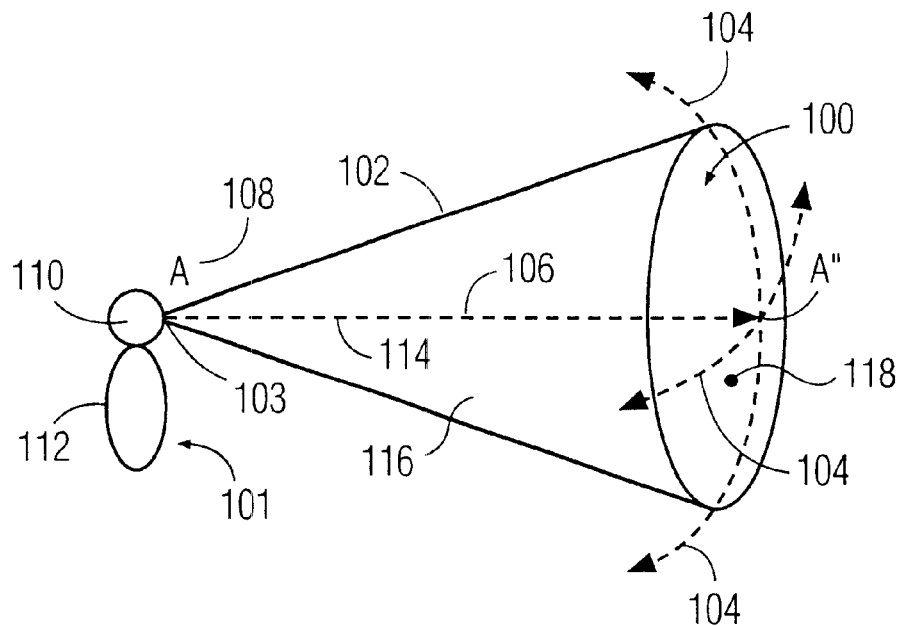
FIG. 2 showing a sense space.
Figure 3:
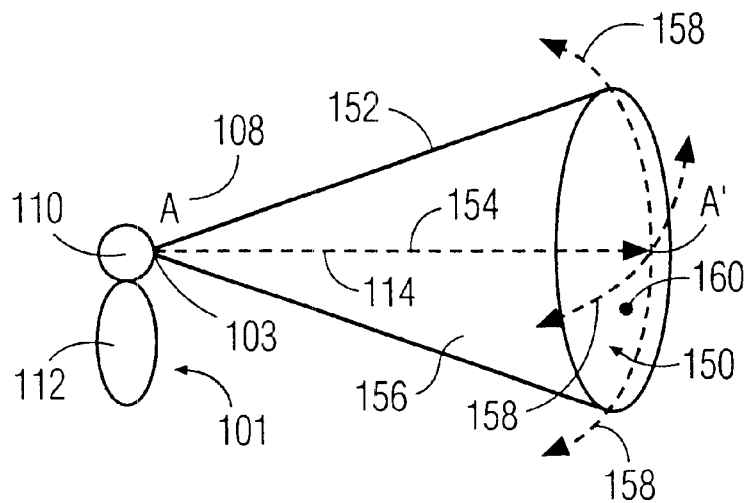
FIG. 3 showing a focus space.

As illustrated in FIGS. 2 and 3, in the context of sight, the attention component's attention space 55 has (i) a sense space 56 comprising a scanning space 100 and (ii) a focus space 58 comprising a gazing space 150. Referring to FIG. 2, the scanning space 100 comprises a vision cone 102 having a vision vector 106.

The vertex "A" 108 of the cone 102 is associated with a selected immersion point 103. In third person view, the immersion point 103 typically is separate from the avatar 101, e.g., a view point. In the case of an avatar 101 in first person view, as shown, the immersion point 103 preferably is a part of the avatar 101. As an example, for sight in first person view, the immersion point 103 preferably is disposed at the center of the avatar's face 110. However, the immersion point 103 can be disposed at the top third of the avatar's face 110 (e.g., the "eyes") or in association with the avatar's body 112. It is to be recognized that these examples rely on the avatar having a face, eyes and/or a body, whereas in any particular implementation, the avatar may be absent one or more of these features.

It also is to be recognized that, in any particular implementation, the attention vectors preferably are associated with the selected immersion point 103. Moreover, the attention vectors preferably are oriented at the immersion point 103. In first person view, because the immersion point 103 is associated with some portion of the avatar 101, the attention vectors are also associated with that avatar portion and preferably are oriented substantially perpendicular to a surface of that portion.

The vision vector ($\underline{AA}$") 106 is co-linear with the longitudinal axis 114 of the cone 102 and has a length described by the value |AA"|. The vector 106 resides in the three dimensional space of a vision sphere 104. In first person view, the avatar 101 preferably is disposed at the center of the vision sphere 104. In third person view, the participant preferably is effectively so disposed. As described further below, the vector's direction describes the center of effective attention and its length limits the distance within which attention can be directed.

Referring to FIG. 3, the gazing space 150 comprises a gaze cone 152 having a gaze vector 154. In any one view (e.g., first or third person), the gaze cone 152 preferably shares the vertex (A) 108 and immersion point 103 of the associated vision cone 102.

The gaze vector (AA') 154 comprises the longitudinal axis 114 of the cone 102 and has a length described by the value |AA'|. The vector 154 preferably is co-linear with the vision vector 106, directed along axis 114. However, it is understood that other orientations of vector 154 can be selected without departing from the principles of the invention. Typically, the length of the gaze vector 154 is less than or equal to the length of the vision vector 106 (i.e., |AA'|<= |AA"|) and the internal angle of the gaze cone 152 preferably is smaller than or equal to the internal angle of the vision cone 102. As described further below, the gaze vector's direction describes the center of focus and its length limits the distance within which attention can be focused.

The scanning and gazing spaces 100, 150 preferably are bounded. The gazing space 150 preferably is bounded by two surfaces: (i) the surface 156 of the gaze cone 152 and (ii) the surface 160 of a gaze sphere 158. Similarly, the scanning space 100 preferably is bounded by two surfaces: (i) the surface 116 of the vision cone 102 and (ii) the surface 118 of the vision sphere 104. The center of the gaze and vision spheres 158, 104 is the immersion point 103 associated with the vertex 108 (e.g., A) of the respective cones 152, 102. The radius of the gaze sphere 158 is the length of the gaze vector 154 (e.g., |AA'|); the radius of the vision sphere 104 is the length of the vision vector 106 (e.g., |AA"|). Bounding in first person view is illustrated in FIG. 3 for the gazing space 150 and in FIG. 2 for the scanning space 100. Similar bounding applies to the spaces in third person view.

Figure 4:
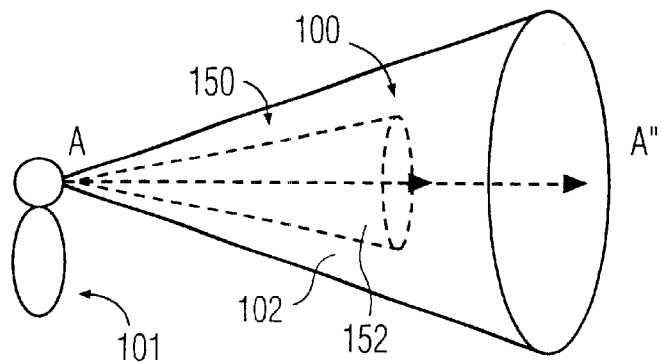
FIG. 4 showing a focus space contained by a sense space.

Because the length of the gaze vector 154 typically is less than or equal to the length of the vision vector 106, the gazing space 150 typically is contained by the scanning space 100, as illustrated in FIG. 4. Moreover, because the spaces 100 and 150 preferably are bounded in part by respective spheres 104, 158, the spaces 100 and 150 preferably comprise conical sections of the respective spheres 104, 158. In addition, these spheres preferably comprise the bounding volumes in that the associated attention cones are thereby able to be enlarged within the respective spheres (i.e., by increasing a cone's internal angle of rotation) so as to, at an extreme and in the absence of any orientation change within the volume, encompass substantially all or entirely all of the sphere, While the system 8 enables perception of vision signals associated with virtual objects located in the vision sphere 104, the bounding of the scanning space 100 typically establishes effective limitations to such perception (e.g., as described below, rendering typically is limited to a predetermined space). In turn, the bounding of the gazing space 150 establishes effective limitations as to the focus in gazing. As to sight in first person view, for example, the vision sphere's surface 118 typically defines the avatar-based maximum perception limits, while the vision cone's surface 116 defines the avatar-based effective perception limits. In turn, the gaze cone's boundaries effectively limit the avatar-based visual focus as to the other avatars and other virtual objects. In an implementation that supports first person view in accordance with this example, the participant preferably is enabled to have spontaneous interaction sessions with the avatars and other virtual objects that are in gazing space 150 of the participant's avatar.

The use and bounding of attention spaces, spheres, cones, vectors and the like preferably is selectably applicable in first person view, third person view, or both. If both such views are implemented, it is preferred that they be independently configurable. As an example, first person view can be implemented to have associated therewith each of attention spaces, spheres, cones, vectors, vertex, and immersion point while, for third person view, having associated a combination of some or all of these elements.

If both views are implemented, it is preferred that, when one view is selected, the attention spaces thereof control attention (the "control view"). In such case, the attention spaces of the other view are off or defeated (i.e., dependent and concerted operation). However, it is to be understood that the views can be implemented so that when one view is selected, the other view's attention spaces are not off or defeated (i.e., the spaces have independent and concurrent operation as to attention).

Accordingly, for sight, a scanning space typically describes the limits of the participant's perception respecting the virtual environment. In first person view, the participant, looking through the "eyes" of their avatar, can perceive via sight only those virtual objects that are resident in the scanning space 100. In third person view, the participant preferably is not constrained by the scanning space 100 of first person view: the immersion point typically is separate from the participant's avatar and the applicable scanning space preferably is a selectable portion of the virtual environment. Moreover, elements of the third person spaces (e.g., spheres, cones, etc) preferably have selected dimensional and spatial relationships with correlative elements of first person spaces. In that regard, it is understood, among other relationships, that (i) the third person vision sphere can be larger, smaller or equal in size to the first person vision sphere, (ii) a supported third person vision cone can include some, all or none of the first person vision cone and (iii) supported attention cones of third person view may contain some, all or none of the participant's avatar. In one specific case, supported third person spaces are implemented so that rendering enables the participant to perceive not only what they would perceive if in first person view, but also a selected portion of the virtual environment supplemental thereto.

One advantage of supporting third person view is that the participant is further enabled to pursue interaction with virtual objects, particularly those objects that are disposed outside their avatar's first person scanning space 100. As an example, the participant is enabled to use explicit controls to initiate intentional interaction with objects outside the first person scanning space 100. In addition, the participant can navigate their avatar toward and into sufficient proximity of a selected object, so as to establish the conditions associated spontaneous interaction. Moreover, if third person view is implemented to include a gaze cone, spontaneous interaction can be supported in third person view.

Although the sense space's cone 60 is applicable to the attention component as respects sight, it is to be recognized that the cone 60 may or may not be applicable as respects other senses, subject to the application and/or the content development. As an instance contrasting the sight examples of this document, applications can implement the sense of hearing as generally spacial: a participant is enabled to perceive sounds emanating from a broad range of dispositions (e.g., from all directions and distances, subject to a maximum distance from the immersion point, whether that immersion point is at an avatar in first person view or separate from an avatar in third person view), regardless of the orientation of the participant's ears and absent (or substantially absent) any directional sensitivity. So implemented, the participant generally can pinpoint the source of the sound with a relatively good accuracy. Accordingly, an attention space 55 that is associated with the sense of hearing preferably is implemented either (i) without a sense cone 60 or (ii) with a sense cone 60 that is co-extensive or substantially co-extensive with the sense sphere 62 (i.e., the interior angle is or approaches 180 degrees).

The Gaze Condition

The avatar attention component 52 preferably provides, in a virtual environment, that (i) a participant A is enabled to interact with an object O when A is gazing at object O (referred to as one-sided gaze), and (ii) two participants A and B are enabled to have an interaction session when A is gazing at avatar B and participant B is gazing at avatar A (referred to as mutual gaze). As to gazing, the avatar attention component provides that participant A is gazing at object O or avatar B provided object O/avatar B is disposed in a gaze cone of A. Similarly, the avatar attention component provides that participant B is gazing at avatar A provided avatar A is disposed in a gaze cone of B. (In this document, an italicized, capital letter—e.g., A—sometimes refers to a participant, the participant's avatar, either, or both.)

It is preferred that the virtual environment support gazing in either first or third person views, or both, with or without contextual conditions. As examples, the avatar attention component can be implemented to provide various circumstances under which A is mutually gazing with B, including: (i) avatar B is disposed in A's first person gaze cone while avatar A is disposed in B's first person gaze cone; or (ii) avatar B (A) is disposed in the first person gaze cone of A (B) while avatar A (B) is disposed in the third person gaze cone of B (A); or (iii) avatar B is disposed in A's third person gaze cone while avatar A is disposed in B's third person gaze cone. Particularly in the latter most gazing circumstance, it is preferred that the third person gaze cone is dimensioned to provide for adequate discrimination among objects. If a control view is implemented, the above circumstances of mutual gaze is stated as one general circumstance: avatar B is disposed in A's control view gaze cone while avatar A is disposed in B's control view gaze cone.

For the purpose of brevity, the descriptions of this patent application sometimes cover gazing in first person view. However, it is understood that subject matter thereof extends to third person view and to control view, as is readily appreciated by one of ordinary skill in the art.

Figure 5:
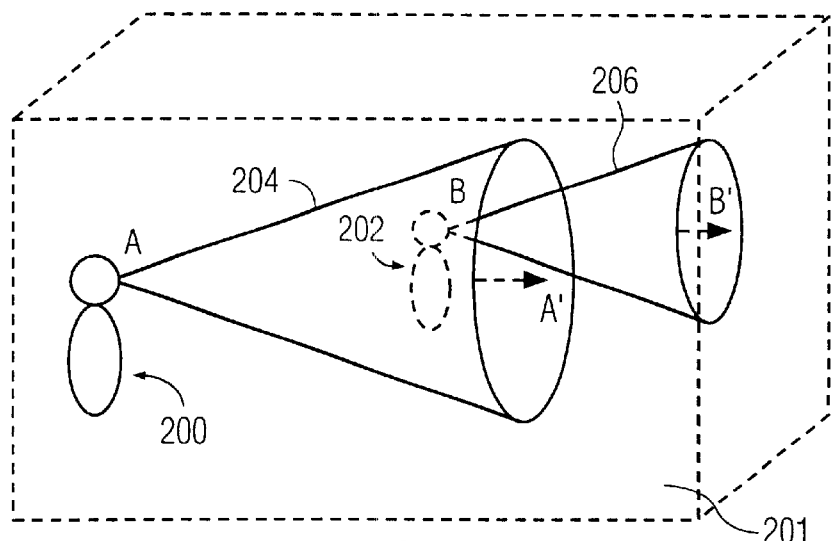
FIG. 5 showing the focus cones of two avatars, wherein only one avatar is disposed in the gaze cone of the other avatar.
Figure 6:
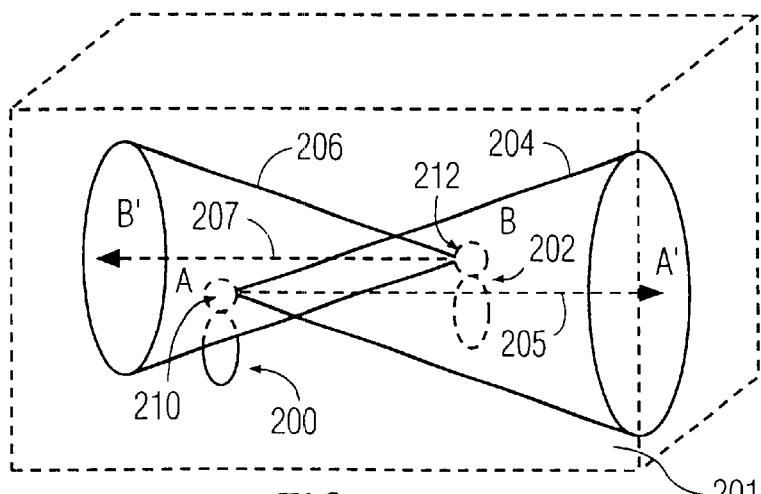
FIG. 6 showing the focus cones of two avatars, wherein each avatar is disposed in the gaze cone of the other avatar.

FIG. 5 shows, in a virtual environment 201, an example of a first avatar 200 gazing at a second avatar 202, i.e., the second avatar 202 is within the first avatar's gaze cone 204. However, the second avatar 202 is not gazing at the first avatar 200, as the first avatar 200 is outside the second avatar's gaze cone 206. FIG. 6 shows, in a virtual environment 201, an example in which the first and second avatars 200, 202 are gazing at each other in first person view and, therefore, are enabled to have an interaction session. In such case, first avatar 200 is enabled to be in mutual gaze with second avatar 202, because each avatar is disposed within the respective focus cone of the other.

Dispositions of avatars, objects, immersion points and the like can be determined in various ways. As an example, the disposition of an avatar can generally be determined by the disposition of the vertex of an avatar's first person focus cone, as each such vertex typically is associated with a immersion point at the avatar (e.g., face or eyes). As such, an avatar is within a participant's first or third person gaze cone when a selected focus cone vertex of the avatar is within the participant's first or third person gaze cone. As another example, however, the disposition of an avatar, and particularly non-avatar objects, can be determined independently of any associated cone and/or vertex. To illustrate, where an avatar comprises one or more objects, the dispositions of these objects can be determined relative to the first person immersion point of the avatar. As yet another example, the dispositions of these and other objects, as well as the avatar, can be determined based on one or more markers placed in the virtual environment or based on some other mechanism, all without departing from the principles of the invention.

In FIG. 6, the gaze vector 205 associated with the first avatar 200 appears parallel to the gaze vector 207 associated with the second avatar 202. However, it is recognized that the respective such vectors 205, 207 need not be parallel, e.g., the vectors 205, 207 can be skewed. More generally, the vectors associated with a mutual gaze need not have a particular, relative orientation.

It is to be recognized that, although the virtual environment 201 of FIGS. 5 and 6 is depicted as a three-dimensional, rectangular space, the environment 201 is not limited to rectangular space, e.g., it can be a spherical or other space. Moreover, the environment 201 can support more or less than three dimensions, without departing from the principles of the invention. That is, within the dimensional parameters of the applicable virtual environment 201, the invention provides for attention-based interaction (whether that interaction, as described below, is spontaneous, intentional or a combination of these and/or other forms).

It is also to be recognized that the virtual environment 201 of FIGS. 5 and 6 generally is a space that, in size, exceeds the attention space. When an avatar/participant moves in the virtual environment (e.g., associated with movement of the first or third immersion points, or both), the associated attention space(s) preferably move as well. In doing so, the orientation of the attention cones and vectors within the relevant attention space(s) preferably is associated with the immersion point. Such association preferably is a fixed relationship. As an example, the association can provide a Cartesian coordinate system wherein (i) the origin correlates with a respective immersion point 103 and (ii) one axis correlates with an attention vector, e.g., the x-axis being along the vision vector 106. Accordingly, while the attention cones of an attention space preferably are implemented to have a selected orientation relative to the respective sense and focus spheres, the attention cones are enabled to have dynamic orientation and position relative to the virtual environment.

Subject to proper conditions, an embodiment of the present invention provides that a participant preferably is enabled to have an interaction session when one-sided gaze arises with a non-avatar object or when mutual gaze arises with an avatar. One-sided or mutual gaze that leads to interaction is sometimes referred to herein as the "gaze condition".

Whether a gaze condition is satisfied is determined by selected computations. These computations can be configured to comport with the differences in interactions (e.g., as to time tolerances and default size of attention space components). As an example, interaction with a non-avatar object typically is to transfer predetermined information from at least one object to the other, while interaction with an avatar typically has one or more aspects relating to real interaction between people, e.g., extemporaneous and/or social aspects). As such, interaction involving a non-avatar object may be treated differently, as to computations, than interaction with an avatar.

Figure 7:
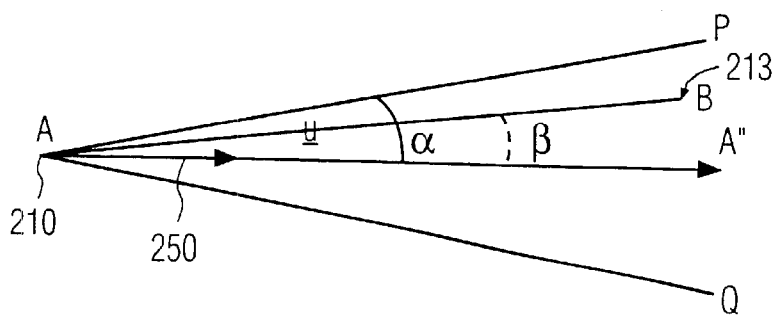
FIG. 7 showing features resulting from the intersection of a focus cone and a plane containing both a gaze vector of one avatar and the line from that avatar to the other avatar in FIG. 6.
Figure 9:
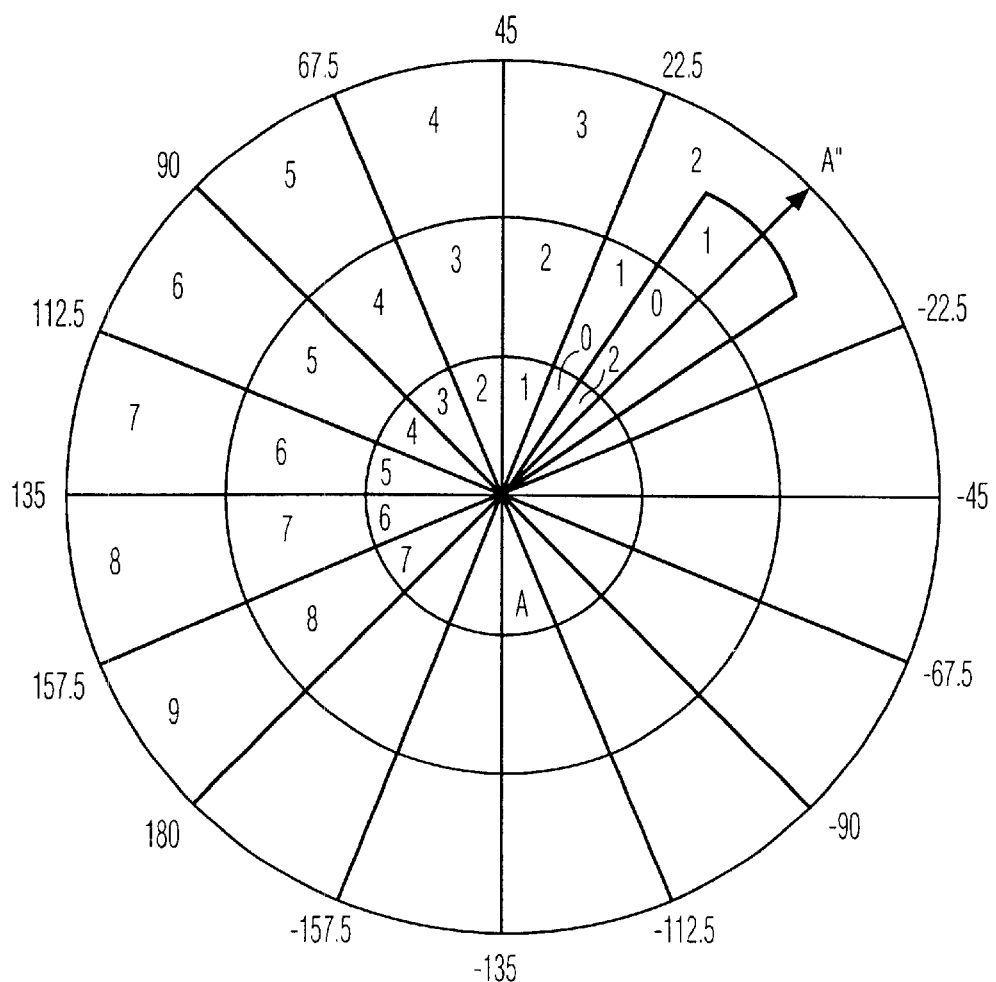
FIG. 9 showing one embodiment of a priority component's priority regions as projected in a plane containing the center of the focus and sense spheres and the focus and sense vectors, according to the principles of the invention.

One embodiment of a gaze condition computation is set forth below, in connection with FIG. 7. FIG. 7 shows the intersection of a gaze cone 204 and a plane, the plane being determined by the line AA' and an immersion point 213 of an object B in the gaze cone. The intersection forms and/or includes several features, including (i) vector $\underline{AA'}$, which is the gaze vector 205 associated with the gaze cone 204, (ii) line segments AP and AQ, which segments intersect at vertex 210 of the gaze cone 204, (iii) angle PAA', this angle being formed by vectors $\underline{AP}$ and $\underline{AA'}$ as marked by the solid arc denoted by the symbol α, which angle is the angle of rotation for the gaze cone, (iv) AB, being the vector connecting from the vertex of the gaze cone 204 to the position of the object B (e.g., B's disposition, in B is first person view, can be given by the associated immersion point 213), and (v) angle BAA', being the angle formed by vectors AB and $\underline{AA'}$ as marked by the dashed arc denoted by the symbol β. Because $\underline{AA'}$ preferably is co-linear with the symmetrical axis of the cone 204, it is understood that the above features sufficiently describe the intersection for the purposes of the gaze condition computations.

Generally, the length of the gaze vector $|\underline{AA'}|$ and the size of angle PAA' are determined when the gazing space 150 is established. Moreover, the frequency at which such length and size are changed, if any, is expected to be much smaller than the frequency at which the gaze condition is computed. Accordingly, each of such length and size preferably is treated as a constant in the gaze condition computations.

The case of mutual gaze in first person view is illustrated by the combined features of FIG. 6 and FIG. 7. In such illustrative case, the gaze cone 204 is associated with avatar 200. In addition, the object associated with the first person immersion point 213 comprises avatar 202 and, in turn, the position of the avatar 202 can be associated with vertex 212. As such, the participant A is gazing at avatar 202 via avatar 200, provided:

$$|AB| < |\underline{AA'}| \text{ AND } \beta < \alpha,$$

where $0° \leq \alpha \leq 180°$ and $0° \leq \beta \leq 180°$. The comparison of the angles (β<α) can be changed to a comparison of their cosine values: cos β > cos α. Moreover, $|\underline{AA'}|$ and cos α can be replaced, respectively, by $L_a$ and $C_a$, these replacements have values determined by the dimensions of the gaze cone 204 and wherein the subscripts "a" associate the constants to A (as previously stated, the values of $L_a$ and $C_a$ can be treated as constants in these computations, without departing from the principles of the invention). In addition, $u_a$ denotes the unit vector associated with the gaze vector $\underline{AA'}$.

After substituting the left side cosine with its computation using a dot product of vectors and substituting the right side cosine with constant $C_a$, the second portion of the gaze expression becomes:

$$[(AB@u_a)/|AB|] > C_a$$

where (a) $AB@u_a$ is the dot product of vector AB and the unit vector $u_a$, (b) $|AB|$ is the length of vector AB, and (c) the symbol '/' represents division.

Re-combining the above cosine conditions with the magnitude condition leads to the following overall definition of the one-sided gaze condition of "A is gazing at B":

$$C_{gab} = [(|AB| < L_a) \text{ AND } (AB@u_a > |AB|*C_a)]$$

where the symbol '*' represents multiplication. Similarly, the overall definition of the one-sided gaze condition of "B is gazing at A" is:

$$C_{gba} = [(\underline{BA}| < L_b) \text{ AND } (\underline{BA}@u_b > |\underline{BA}|*C_b)]$$

where $L_b$ is the length of B's gaze vector 207, $C_b$ is the cosine of the half angle of avatar B's gaze cone 206, and $u_b$ is the unit vector associated with the gaze vector BB'.

If A and B are gazing at each other, the mutual gaze condition is satisfied. As such, the mutual gaze condition is expressed as:

$$C_g = C_{gab} \text{ AND } C_{gba}$$

Although the above computations of the one-sided and mutual gaze conditions are described in the context of avatar-avatar gazing in first person view illustrated in FIGS. 6 and 7, it is understood that the computations are applicable to other gazing circumstances. As an example, computations for the one-sided gaze condition apply to a participant gazing in first or third person view at a non-avatar object. Moreover, computations for the mutual gaze condition apply to (i) a first participant gazing in third person view at a second participant's avatar, together with the second participant gazing in either first or third person view at the first participant's avatar and (ii) other circumstances of gazing selected for support in the virtual environment. In addition, if control view is implemented, the computations employ control view gaze cones and features associated therewith, as previously described. It is also understood that, although the above computations are directed to sight, the computations can be extended to other senses, whether analogs of human senses or not, without departing from the principles of the invention.

When multiple objects ("candidates") satisfy the gaze condition as to a participant's first or third person gazing (the "targeter"), interaction can be conducted as a group. However, if a single candidate is preferred, that candidate can be determined according to object priorities and/or selected rules defined by an application. As an example, when the gaze condition is satisfied between the targeter and two candidates, one candidate being an avatar and the other a non-avatar object, and the context emphasizes social interaction, the avatar preferably is selected to have interaction priority. As another example, when the gaze condition is satisfied as described above, but the context emphasizes other than social interaction, either the avatar or the non-avatar object may be selected to have interaction priority, with the selection being based on the prevailing priorities and/or rules. This latter example is illustrated via a virtual hockey match in which various participants' avatars are the players and non-avatar objects include the puck: (i) the puck may be selected at a first moment, particularly for shooting on net, racing up ice or the like while (ii) a player may be selected at a second moment, particularly for applying a check.

If priorities/rules fail to identify a single, highest-priority candidate, other mechanisms preferably are supported. Such other mechanisms include, as examples, providing for random selection, enabling the participant to select among the candidates, and supporting selection of multiple candidates. The Set-Priority control (discussed hereinafter respecting intentional interaction) preferably can be used to instruct the system 8 as to both computing rendering priorities and choosing among the candidates.

If group interaction is preferred, the targeter can use the Attention-Request control (discussed hereinafter respecting intentional interaction) to select one group member at a time for pair-wise interaction while still interacting with other group members. In this case, the priority component can be set to produce the highest priority for the selected pair-wise partner, the next highest to the other group members, and lower priorities to non-group members. Guided by these priorities, the targeter's perception of signals (e.g. animations, sound) of the pair-wise partner is enhanced, while also perceiving signals from other group members at a level above that of non-group members. The targeter can also use Attention-End control (also discussed hereinafter respecting intentional interaction) to exclude an object (e.g., the avatar and, therefore, the participant represented by the excluded avatar) from a group. As a result, different members of a group can perceive different group subsets.

The gaze condition computations, described above, can be extended to perception by objects in the virtual environment. While the gaze conditions are associated with focus space, perception is associated with sense spaces. Accordingly, one approach to providing perception computations is to alter the gaze condition computations by employing sense space parameters in place of focus space parameters. In the specific case of sight, the gaze space parameters would be replaced by vision space parameters.

2. Attention Drift.

Preferably embodiments of the invention account for attention drift. Attention drift contemplates changes in attention parameters while engaged in an interaction session. (The participant or object with which the participant is engaged in such session—whether in first or third person view—is sometimes referred to as the "partner".)

Attention drift is associated with a plurality of activities in the virtual environment. Examples of such activities include: (1) avatar A moves its position in the virtual environment, the movement and final position being confined to vision/gaze cones relevant to interaction with partner B; (2) avatar A moves outside at least one of the vision/gaze cones relevant to interaction with partner B; (3) A and partner B are stationary relative to one another, but A shifts its gaze vector so that partner B is no longer within a gaze cone of A relevant to interaction; (4) A both moves its position in the virtual environment relative to partner B and shifts its vision/gaze cones such that partner B is no longer within a relevant gaze cone of A; (5) A's gaze cone intersects the gaze cone of a non-partner C with or without partner B falling out of one or both of A's vision/gaze cones; (6) non-partners explicitly attempt to grab A's attention; and (7) non-avatar objects send signals intending to grab A's attention.

In the case of attention drift respecting a virtual object's movement within its partner's attention cones, a possible embodiment is to ignore such movement as respects being engaged in an interaction session with the partner. However, it is preferred that such movement be a factor in the priority component 54 of the system 8. In the absence of such factoring, the object appears to its partner as if frozen in position during the interaction session, notwithstanding its movement. In the presence of such factoring, however, rendering reflects the movements, toward enhancing (e.g., making more natural) the appearance in the virtual environment. As an example, more detail of the object's appearance and louder/clearer voice(s) are rendered when the object moves relatively closer to its partner, while less detail and quieter/less clear voice(s) are rendered when the object moves relatively farther from its partner. (In such example, it is understood that the term "relatively closer" generally reflects the virtual environment's configuration as to a "closeness" characteristic.)

In cases of attention drift wherein mutual gaze is broken, it is preferred to provide that the gaze condition be subject to one or more attention drift tolerance factors. The attention drift tolerance factors preferably are temporal and are associated with predetermined system action. As examples: (i) if avatar A moves outside B's relevant gazing space during an interaction session, the system warns the participant associated with avatar A, e.g., by sending a textual warning message to the participant's host and (ii) if avatar A remains outside B's gazing space for a time period exceeding a selected time tolerance, the system concludes that avatar A's participant is not interested in continuing the session with B, at which point the system takes predetermined action, e.g., terminates the session. (It is recognized that termination of the session based on exceeding the time tolerance is correlative to establishing the session based on maintaining mutual gaze for greater than a selected time period.)

In implementation of attention drift tolerance factors, the system 8 preferably traces the effect of the factors on the value of the gaze condition. In the context of the temporal factors, for example, the system traces the time duration in which the value of the gaze condition holds/has held a prevailing value and compares traced time durations with the selected time tolerance. In one embodiment, the tracing approach engenders modifying the gaze condition computation as follows:

Let $C_g$ be the value of the mutual gaze condition, i.e., $C_g = C_{gab}$ AND $C_{gba}$;

Let $t_g$ be the time duration in which $C_g$ holds/has held a value;

Let T be the time tolerance of attention drift;

Accordingly:

A and B can initiate a session of spontaneous interaction provided the following condition is true: ($C_g$= TRUE) AND ($t_g$>T); and A session of spontaneous interaction between A and B is automatically terminated if the following condition becomes true;

($C_g$=FALSE) AND ($t_g$>T)

It is to be recognized that the one-sided gaze condition can be used for $C_g$ in the above computation, in keeping with the application and/or content development needs. It is also to be recognized that the time tolerance T need not have the same value for all cases and circumstances. As an example, in the above formulae, time tolerance T can have different values for one or more of a session's initiation, conduction and termination. As another example, the value of T can depend on a participant's behavioral history in the virtual environment. An illustration of the latter example is to have the value of T be a function of the frequency of attention drift: e.g., if the participant is subject to relatively frequent attention drifts (as measured against a predetermined value or against an environment's static or dynamic statistical characteristics, or otherwise), T increases as to initiation and/or decreases as to termination, or the reverse, or combinations.

Explicit Controls

Intentional activation of an interaction session preferably is by selected use of explicit controls. In addition, however, explicit control may also be relevant to spontaneous interaction. In any case, the explicit controls can be used either by a participant, by an avatar (e.g., typically based on a participant's affirmative action) or by a non-avatar object (e.g., based on programming). It is understood that explicit controls can be used in either first or third person views. As an example, intentional activation of interaction can be initiated with a partner even if the partner is disposed outside an avatar's attention space, as the avatar's participant preferably is enabled to employ explicit controls based either on the prevailing third person view or based on the identity of the partner.

Explicit controls preferably include, among others, the following:

Display-Attention: a control triggering display one or both of the sense and focus spaces 56, 58. Generally, the sense and focus spaces 56, 58 preferably are not displayed. However, the space(s) can be displayed by activating one or more Display-Attention controls. (An example of this control is a mouse click on an avatar's face 110.) So activated, the control preferably causes display of the associated space(s) 56, 58—either graphically (i.e., as a cone) or textually (i.e., as disposition parameters of the space and the state of the object), or some combination thereof. It is to be recognized that the associated space can be displayed in other ways without departing from the principles of the invention.

Hide Attention: a control to make disappear the displayed sense and/or focus space(s) 56, 58. This control can be implemented in various ways, including: (i) a toggle on the Display-Attention control; (ii) a click on a displayed gaze cone 152; and (iii) a text form (e.g., from a menu).

Set Attention: a control to establish one or more sets of parameters respecting sense and/or focus spaces 56, 58. One set of parameters preferably is related to the size of the respective space, e.g., the coverage angle (angle PAA' in FIG. 7) of the respective vision/gaze cones 102, 152 and/or the length of the respective vision/gaze vectors 106, 154. The default length for a sense vector preferably is the radius of the respective sense sphere 104, and the default length for a focus vector preferably is the length of the respective sense vector 106. The sets of parameters can be variously employed, including (a) to handle attention drift, e.g., time tolerance for attention drift, and (b) to express or be responsive to the sociability of a participant at any particular time or from time to time. As an example of the latter, a participant sets a gazing space 154 either (i) to a relatively small value to effect the desire to be left alone or (ii) to a relatively large value to effect the desire to be social. This control can be variously implemented, including through one or more of a pop-up preference box and a direct manipulation of the graphic representation of a cone and/or vector (e.g., responsive to a selected logic-based and/or rules-based determination in the case of a non-avatar object).

Turn-Attention: a control to turn the direction of a sense/focus vector and cone. In both first and third person views, the direction of the sense/focus vector preferably is controlled by controlling the orientation of an associated object (e.g., the direction the participant's avatar is facing or the direction of a third-person camera). In such case, a control separate from that which determines the object's orientation is not necessary to implement the Turn-Attention control. However, a separate control or controls can be provided, without departing from the principles of the invention. In first person view, such a control is preferred, if a vector's direction can be other than normal to a surface of the avatar at which is disposed the immersion point. Moreover, in third person view, a control typically will be associated with control of the immersion point. In control view, a control preferably is linked to the control view attention cones. (Because this control controls the orientation of attention cones, it is to be recognized that this control is an example of explicit controls relevant to both intentional and spontaneous activation of an interaction session.)

Attention-Request: a control to request attention. Responsive to activation of this control, an attention-request message is automatically sent to the prospective partner. As an example and subject to implementation, all or a subset of the following are supportable if this control is activated: (1) a relevant sense/focus vector associated with the activating source (e.g., a participant or an object) becomes directly pointed toward the prospective partner; (2) a relevant sense/focus cone associated with the activating source moves to enclose the prospective partner (if the partner is originally outside such cone); (3) detailed information respecting the activating source is readied for transmission to the prospective partner; and (4) the activating source (e.g., via its host) is readied to receive and/or starts to act on (e.g., displays) detailed information respecting the prospective partner. This control can be variously implemented, including by an affirmative mechanism (e.g., a double click of a pointing device—such as a mouse—on a selected object feature, such as a face) and/or by an automatic mechanism (e.g., responsive to a selected logic-based and/or rules-based determination, such as in the case of a non-avatar object). Moreover, implementation preferably provides that the prospective partner's receipt of the attention-request message triggers automatic, responsive action. As an example, in the case where the prospective partner has an associated participant, the partner's receipt of the attention-request message preferably causes an attention-requested signal to become manifest at the partner's host, such as on the video screen used by the partner's participant. Exemplary implementations of such attention-requested signal include (i) flashing or otherwise modulating the image (or part thereof) of the object associated with the attention-request message, (ii) providing a selected gesture, expression or other semaphore (e.g., a smile or a waving hand) for the object associated with the attention-request message, and (iii) displaying a selected message (e.g., displaying a text message on the video screen used by the partner's participant).

Attention-Grant: a control to grant attention. When this control is activated responsive to activation of an Attention-Request, an attention-granted message is sent from the prospective partner to the source of the Attention Request. As an example and subject to implementation, all or a subset of the following are supportable if this control is activated: (1) a relevant sense/focus vector of the prospective partner becomes directly pointed at the source of the Attention-Request; (2) a relevant sense/focus cone associated with the prospective partner moves to enclose the source (if the source is originally outside such cone); (3) detailed information about the prospective partner is transmitted to the source; and (4) the prospective partner (e.g., via its host) is readied to receive and/or starts to act on (e.g., displays) detailed information about the source. When the attention-granted message is received by the source (e.g., at the host), the source and the partner are enabled to have an interaction session. This control can be variously implemented, including by an affirmative mechanism (e.g., via a key stroke—'y'—with a pointing device—such as a mouse—positioned on the source's object, or via a single-click of a pointing device on the graphical representation of the attention-requested signal) and/or by an automatic mechanism (e.g., responsive to a selected logic-based and/or rules-based determination, such as in the case of a non-avatar object). (It is also preferred that, in the case of a participant initiating intentional interaction with an object, the interaction session has associated therewith either/both enhanced rendering of the object or/and the display of expanded information about the object— e.g., its home web page—at the participant's host.)

No-Attention-Grant: a control to refuse a request for interaction. When this control is activated responsive to activation of an Attention-Request, a no-attention-granted message is sent from the prospective partner to the source of the Attention Request. Implementation of this control preferably provides that the source's receipt of the no-attention-granted message triggers automatic, responsive action. As an example, if the source is associated with a participant, a no-attention-granted signal preferably becomes manifest at the source's host, e.g., on the participant's video screen. Exemplary implementations of the no-attention-granted signal include (i) fading all or a portion of the object from which attention was sought (e.g., fading the face of an avatar), (ii) providing that object with a selected gesture, expression or other semaphore (e.g., a frown, or shaking the avatar's head, or a discouraging hand wave) and (iii) providing a text or other message for presentation at the source (e.g., displaying a text message on the participant's video screen). In any case, when the source receives the no-attention-granted message (e.g., at a host), it preferably is enabled to choose whether or not to stop processing detailed information respecting the prospective partner. This control can be variously implemented, including by an affirmative mechanism (e.g., via a key stroke—'n'—with a pointing device—such as a mouse—positioned on the source's object, or via double-clicking on the graphics representing the attention-requested signal) and/or by an automatic mechanism (e.g., responsive to a selected logic-based and/or rules-based determination, such as in the case of a non-avatar object).

Attention-End: a control to terminate an interaction session. When activated by the source (partner), an attention-end message is sent to the partner (source). As an example and subject to implementation, all or a subset of the following are supportable if this control is activated: (1) the sender of the message stops sending detailed information to the receiver of the message; (2) the sender stops processing detailed information of the receiver and (3) the receiver stops sending detailed information to the sender, stops processing such information for sending, and/or stops processing information received from the sender. This control can be variously implemented, including by an affirmative mechanism (e.g., via a key stroke—'e'—with a pointing device—such as a mouse—positioned on the receiving object) and/or by an automatic mechanism (e.g., responsive to a selected logic-based and/or rules-based determination, such as in the case of a non-avatar object).

No-Disturbance: a control to block attention-request messages while a participant/object is engaged with a partner. Preferably, even if the control is set, attention-request messages are not blocked when the receiver thereof is not engaged. Moreover, the control preferably is implemented so as to be resettable (e.g., the control is automatically reset to unblock attention-request messages when either an engagement terminates or the associated Allow-Disturbance control is set). This control can be variously implemented, including by an affirmative mechanism (e.g., via a button or an entry in a pop-up menu) and/or by an automatic mechanism (e.g., responsive to a selected logic-based and/or rules-based determination, such as in the case of a non-avatar object).

Allow-Disturbance: a control to unblock attention-request messages while a participant/object is engaged with a partner. This control can be variously implemented, including by providing a toggle that sets (resets) this control while resetting (setting) the No-Disturbance control.

No-Attention-Drift: a control to forbid attention drift while a participant/object is engaged with a partner. As an example, this control can be supported by setting the applicable time tolerance to 0. This control can be variously implemented, including as stated below, or as a button or an entry in a pop-up menu.

Allow-Attention-Drift: a control to allow attention drift. When this control is set, engagement in, or disengagement from, an interaction session preferably is supported either through mutual gaze or explicit controls, or both. This control can be variously implemented, including by providing a toggle that sets (resets) this control while resetting (setting) the No-Attention-Drift control.

Show-Profile: a control to display the profile of selected objects. In the case of an avatar, the content of a profile preferably includes, among other information, the respective participant's likes, dislikes, hobbies, and personalities. This control can be variously implemented, including via a key stroke—'p'—with a pointing device (e.g. a mouse) positioned on the object.

Set-Profile: a control to enable change in the content of an object's profile. A profile can be configured so that different versions or portions thereof can be provided and/or rendered accessible. As an example, if a profile is to be provided to a non-avatar object, the provided profile can be selected by the object's type. As another example, if a profile is to be provided to an avatar, the provided profile can be selected by the avatar's associated participant, or by groups and/or categories of participants. To illustrate the latter example, participants appearing in a friend list associated with the profile can be enabled to receive a more-detailed version than participants that are not so listed. Moreover, participants appearing in a pest list may be restricted entirely from receiving or otherwise accessing a profile. This control can be variously implemented, including by providing forms for displaying and changing profiles.

Set-Priority: a control to set parameters for computing priorities. Whether in first or third person view, a participant preferably can selectively change priorities for objects encountered in the virtual environment. Examples of such objects are avatars (including the participant's avatar, specifically the visible parts thereof and non-avatar objects (including parts of an avatar). To illustrate, this control enables the participant to raise the priority of the audio signal of a friend's avatar so that the participant can hear the friend's audio signal clearly whenever the friend enters the virtual environment. To further illustrate, this control enables the participant to lower the priority of a non-partner object that is broadcasting unwelcome messages. Preferably, the participant is also enabled, through this control, to configure the system for resolving conflicts associated with multiple objects contending for the participant's attention. This control can be variously implemented, including by providing forms and sliders.

Using explicit controls, including the above, intentional interaction sessions are enabled. In the context of two avatars, an example process for an interaction session comprises: (1) a first participant either (a) uses the Turn-Attention control to direct a focus cone toward the avatar 204 of a second participant or (b) examines a relevant focus cone of the second participant, e.g., via the Display-Attention control, so as to determine that the second participant is available for interaction, i.e. is not engaged with a partner; (2) using the Show-Profile control, the first participant examines the second participant's profile, determining that the second participant is of interest; (3) first participant requests the second participant's attention, doing so by activating the Attention-Request control, whereupon the first participant waits for the second participant's response; (4) upon receiving the first participant's attention-request message, the second participant sees the attention-requested signal indicating that the first participant seeks attention; (5) using the Show-Profile control, the second participant examines the first participant's profile; (6) based on that examination, or otherwise, the second participant determines whether the first participant is of interest; (7) the second participant either (a) activates the Attention-Grant control or (b) activates the No-Attention-Grant control or (c) turns their relevant gaze cone 206 away from the first participant's avatar, using the Turn-Attention control or (d) relies on logic/rules for an automatic determination of the response; (8) if the first participant receives the second participant's attention-granted message, interaction between the first and second participants is enabled; and (9) if the first participant receives the second participant's no-attention-granted message or detects the turn of the gaze cone, interaction between the first and second participants is disabled. Either of the participants is enabled to terminate the interaction session by activating the Attention-End control.

Although a sequence of steps is set out above, it is recognized that other sequences can apply to intentional interaction. As an example, some of such steps may be omitted. As a more specific example, any one or more of steps 1, 2, 5 and 6 can be omitted, particularly when the two participants are familiar with each other. It is also recognized that additional explicit controls, including other of the previously described explicit controls, may be employed in the above-described or other sequences, without departing from the principles of the invention. It is also to be recognized that, although the explicit controls may be described in terms of being activated by objects, the activation preferably is by action or inaction of a participant when the object is an avatar (i.e., one or more such controls can be implemented for automatic activation, with or without the control also having a participant activation implementation).

4. Interweaving Intentional and Spontaneous Interactions

Figure 8:
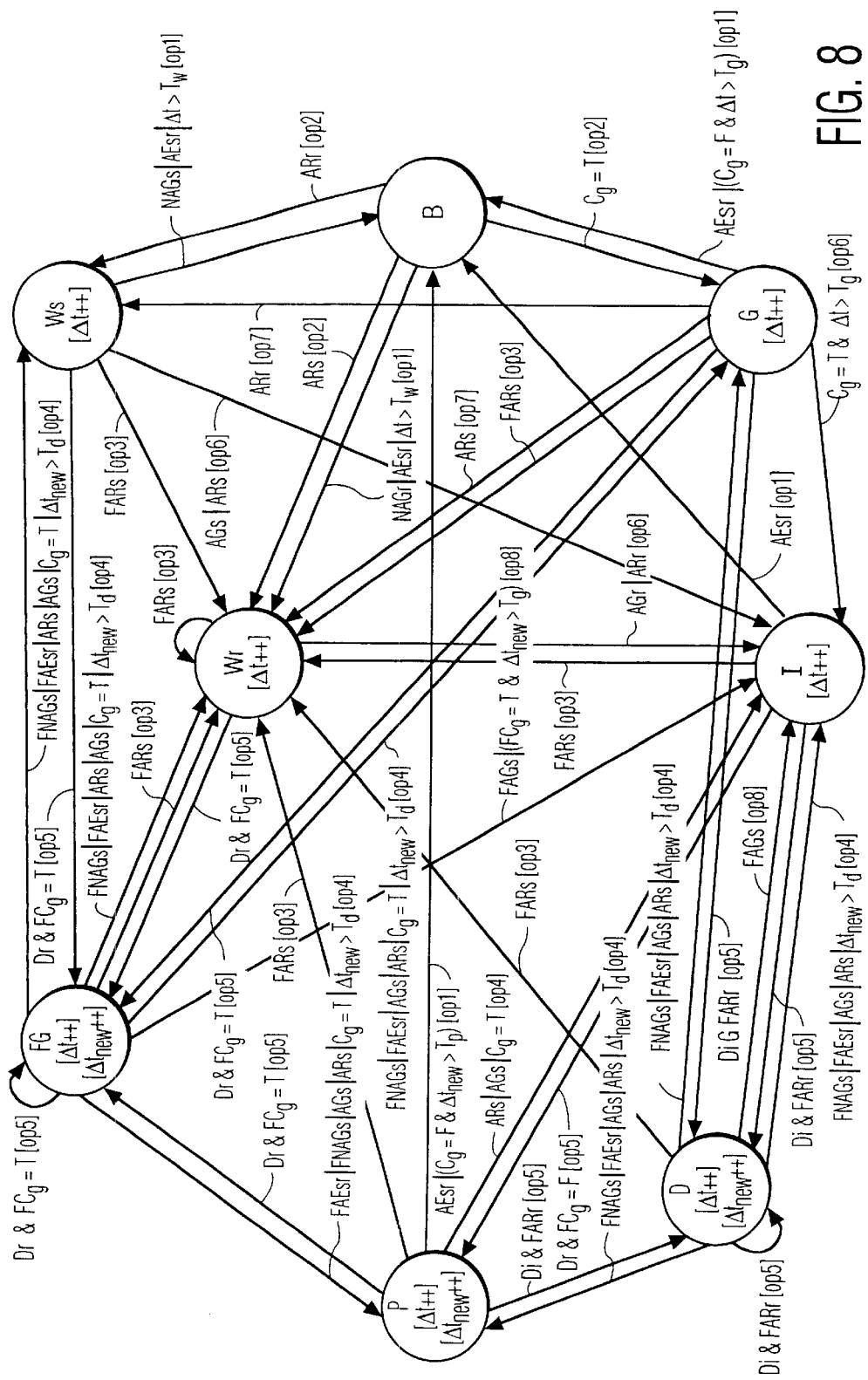
FIG. 8 showing an example state transition diagram associated with an interaction control engine of FIG. 1a, wherein spontaneous and intentional interaction are interwoven.

FIG. 8 illustrates exemplary state transitions for interweaving intentional and spontaneous interaction, preferably associated with an interaction control engine. In the state transitions, a participant and their avatar is represented by A, an original partner is represented by K, and an intruding participant/avatar/object ("intruder") is represented by F. An intruder activates an Attention-Request control, thereby sending an attention-requested message to A when A is in any state other than a base state. It is understood that, if A is in a base state, it is not engaged in an interaction session.

The states of interwoven interaction, and their symbols, comprise:

| | |
|---|---|
| B: | base. A is not involved with any object. |
| Wr: | wait-for-remote-grant. A is waiting for a prospective partner to grant attention. |
| Ws: | wait-for-local-grant. A is waiting to grant attention to a prospective partner. |
| G: | gazing. Gaze condition between A and a prospective partner is true. |
| I: | interacting. A is interacting with a partner. |
| P: | parting. A's attention has drifted while yet interacting with a partner. |
| FG: | f-gazing. Gaze condition between A and an intruder is true while A is engaged with a partner. |
| D: | disturbed. A has received an attention-requested signal from an intruder when engaged with a partner or prospective partner. |

| | |
|---|---|
| $\Delta t$: | time duration that A is in a particular state while engaged with a partner or prospective partner. |
| $\Delta t_{new}$: | time duration that A is in a particular sta4e while disturbed by an intruder, or the gaze condition between A and an intruder is true. |
| S: | A's current state. |
| $S_{old}$: | storage to hold the state from which A is making/has made a transition. |
| partner: | storage to hold the identifier of the current partner. |
| intruder | storage to hold the identifier of the current intruder. |

In FIG. 8, the circles represent states and the directional edges represent transitions between states. The label within a circle contains two parts: the state symbol and the state operations. The label on an edge contains two parts: the condition that triggers the transition and the operations to be performed during a transition. The respective state and transition operations are enclosed in square brackets so as to indicate the operations are to be performed when the transition is taken. The symbols used for the illustrated state and transition operations include:

| | |
|---|---|
| ++: | increment the variable by one unit at predetermined time intervals (e.g., every second, millisecond, microsecond, etc.). |
| op1: | partner = intruder = NULL; $\Delta t = \Delta t_{new} = 0$; $S_{old}$ = ILLEGAL. |
| op2: | partner = KID, where KID is the identifier of a prospective partner. |
| op3: | AEs; partner = FID, where FID is the identifier of an intruder; $\Delta t = \Delta t_{new} = 0$; intruder = NULL; $S_{old}$ = ILLEGAL. |
| op4: | $S = S_{old}$; $\Delta t_{new} = 0$; intruder = NULL; $S_{old}$ = ILLEGAL. |
| op5: | $S_{old} = S$; intruder = FID; $\Delta t_{new} = 0$. |
| op6: | $\Delta t = \Delta t_{new} = 0$; intruder = NULL; $S_{old}$ = ILLEGAL. |
| op7: | $S_{old}$ = ILLEGAL; $\Delta t = \Delta t_{new} = 0$; intruder = NULL. |
| op8: | AEs; partner = intruder; intruder = NULL; $\Delta t = \Delta t_{new} = 0$; $S_{old}$ = ILLEGAL; |

The symbols used for the illustrated triggering conditions include:

| | |
|---|---|
| AEs: | A has sent Attention-End to the partner. |
| AEr: | A has received Attention-End from the partner. |
| AEsr: | A has sent/received Attention-End to/from the partner. |
| AGs: | A has sent Attention-Grant to a prospective partner. |
| AGr: | A has received Attention-Grant from a prospective partner. |
| ARs: | A has sent Attention-Request to a prospective partner. |
| ARr: | A has received Attention-Request from a prospective partner. |
| $C_g$: | The value of the gaze condition between A and a partner or prospective partner. |
| Di: | A allows disturbance from an intruder while engaged with a partner or prospective partner |
| Dr: | A's attention is enabled to drift. |
| FAEsr: | A has sent/received Attention-End to/from an intruder. |
| FAGs: | A has sent Attention-Grant to an intruder. |
| FNAGs: | A has sent No-Attention-Grant to an intruder. |
| FARs: | A has sent Attention-Request to an intruder. |
| FARr: | A has received Attention-Request from an intruder. |
| FC | The value of the gaze condition between A and an intruder. |
| NAGs: | A has sent No-Attention-Grant to a prospective partner. |
| NAGr: | A has received No-Attention-Grantfrom a prospective partner. |
| $T_g$: | The time tolerance in gazing to initiate interaction. |
| $T_p$: | The time tolerance in parting to be considered as attention drift. |
| $T_w$: | The time tolerance in states Wr and Ws before time out. |
| $T_d$: | The time tolerance of the maximum time duration to be in state D or in state FG. |
| &: | logical AND operation |
| |: | logical OR operation |

It is understood that developers can configure their respective systems as to the relationship between the time tolerances in implementing interwoven interaction. As an example, the relationship $T_w>T_g$ can be selected (and the tolerance values therein set) to provide a longer time to initiate interaction by intentional action(s) than by spontaneous initiation. As another example, the relationship $T_p>T_g>T_d$ can be selected (and each tolerance value therein set) to provide that once a partner is engaged, the selecting participant/object has its attention locked, this tolerance relationship requiring affirmative action(s) or enhanced gaze time with an intruder in order for disengagement from the partner and engagement with that intruder. The selected configuration generally is responsive to various factors, including, available system resources and specifics of the application domain.

When A is in the base state B, A is not engaged in an interaction session. After it sends an Attention-Request to K, A enters state Wr to wait for K to grant attention to A. If A has received an Attention-Request from K, A enters state Ws to wait for grant (or no grant) of attention to K. In each case, transition operation op2 is performed.

When an interaction-triggering signal arrives (e.g., for state Ws, AGs or ARs; for state Wr, AGr or ARr), A enters the interacting state for interaction with K. In doing so, transition operation op6 is performed. However, if an appropriate signal does not arrive within a predetermined time period, or if A has sent or received a No-Attention-Grant to or from K, or if A has sent or received an Attention-End to or from K, A goes back to the base state B. In doing so, transition operation op1 is performed.

From the base state B, A can enter the gazing state G, provided the appropriate gaze condition becomes true between A and K. In doing so, transition operation op2 is performed. If the appropriate gaze condition continues for at least the predetermined time tolerance (e.g., $\Delta t>T_g$), A enters the interacting state. In doing so, transition operation op6 is performed. Transition back to state B occurs from each of the interacting and gazing states (G and I) if A either sends or receives an Attention-End to or from the current partner, e.g., K.

The transition back to state B also occurs from gazing state G if (i) A is subject to attention drift and (ii) the condition [($C_g$=FALSE) AND ($\Delta t>T_g$)] is true. In that transition, operation op1 is performed.

From the gazing state G, A can also transition to the state Ws, provided A receives an Attention-Request from the prospective partner K. In so transitioning, transition operation op2 is performed such that the partner storage holds the identifier of the object sending the Attention-Request. It is to be recognized that, although not shown in FIG. 8, the interaction control engine 39 can be implemented to automatically activate the Attention-Granted control on behalf of A while A is in the Ws state, in the event that [($C_g$=TRUE) AND ($\Delta t>T_g$)] becomes true.

From the interacting state, A can also transition to the parting state P, provided (a) A is configured to allow attention drift, (b) the attention of either/both A and A's current partner is drifting and (c) the gaze condition between A and A's current partner is no longer satisfied. From the parting state P, A can re-enter the interacting state with A's current partner, provided (i) the gaze condition is re-established and/or (ii) the drifted A (or B) issues either an Attention-Granted or an Attention-Request to the current partner (or to A). In one implementation, the system provides re-entry via issuance of these explicit controls, provided the relevant control is issued prior to expiration of a selected time tolerance, e.g., the parting time tolerance, $T_p$, clocking from entry to the state P. However, if either (a) A or A's current partner issues an Attention-End, or (b) the attention drift exceeds the selected time tolerance—e.g., the condition [($C_g$=FALSE) AND ($\Delta t_{new}>T_p$)] is true—interaction is terminated and A enters the base state B. In that transition, transition operation op1 is performed.

The disturbed state D accounts for the case where an intruder (e.g., F) has issued an Attention-Request to A, where A is in a state other than the base state and A is configured to allow itself to be disturbed. As illustrated in FIG. 8, if intruder F issues an Attention-Request to A while A is engaged (e.g., in states I, D, G or P), A transitions to the disturbed state. In each case, transition operation op5 is performed.

If A issues Attention-Granted to the intruder (e.g., to F) an Attention-End message is sent to the now-previous partner (e.g., to K) in the form of transition operation op8. In that case, A transitions to the interacting state, the now-current partner being the now-former intruder (e.g., F).

In disturbed state D, if A issues to the intruder either a No-Attention-Grant or an Attention-End, or if A receives an Attention-End from the intruder, or if A issues an Attention-Grant or an Attention-Request to the partner (e.g., to K) or the time tolerance expires respecting the duration that A can remain in state D (e.g., $\Delta t_{new}>T_d$), A returns to the state from which it transitioned to the disturbed state. If the original state in which A was disturbed is the interacting state, interaction with the original partner preferably continues while A is in the disturbed state.

Preferably A is enabled to transition to the f-gazing state (FG) under various conditions. For example, FIG. 8 illustrates one embodiment wherein A is enabled to transition to state FG from each of the states Ws, Wr, G, FG and P. In these transitions, A is configured so as to allow attention drift (e.g., Dr is true) and, moreover, the transition can occur if the gaze condition between A and the intruder is true. In each case, transition operation op5 is performed.

From the FG state, A transitions to the interacting state if (i) the gaze condition between A and the intruder has been true for at least a predetermined time tolerance (e.g., $\Delta t_{new}>T_g$) or (ii) A sends an Attention-Grant to the intruder. In doing so, transition operation op8 is performed such that the partner storage holds the intruder's identifier and the intruder storage becomes NULL. Also in the transition, an Attention-End is sent to the now-previous partner, e.g., to K.

A returns to the state from which it transitioned to the FG state if (i) the gaze condition for A and the current partner (e.g., K) becomes true, (ii) the time tolerance expires respecting the duration that A can remain in state FG (e.g., $\Delta t_{new} > T_d$), (iii) A issues to the intruder (e.g., to F) either a No-Attention-Grant or an Attention-End, (iv) A receives an Attention-End from the intruder (e.g., from F), or (v) A issues an Attention-Grant or an Attention-Request to the current partner (e.g., to K). If the original state from which A was disturbed is the interacting state, interaction with the partner preferably continues, even while A is in state FG. In transition back to the original state, transition operation op4 is performed.

From each state other than the base state B, A transitions to state Wr if A issues an Attention-Request to an object other than the current partner (e.g., other than K), so as to wait for the prospective new partner to grant/deny attention. In the transition, transition operation op3 is performed.

So as to minimize the complexity of the state transition implementation, it is preferred to ignore an Attention-Request from an intruder while A is in either of the waiting states Ws or Wr, or in the state FG. As to other states, the No-Disturbance explicit control (see description above respecting intentional interaction) can be used to block an intruder's Attention-Request.

In any case, the No-Attention-Drift explicit control can be used to forbid A's attention drift.

Priority Component

An interaction session preferably enables priority in rendering. So as to enable priority in rendering, the system 8, as depicted in FIG. 1, comprises the priority component 54. The priority component 54, generally stated, provides, separately to each participant, priorities for objects within the participant's attention space or spaces. The priorities preferably are used to determine not only which objects to render, but also the rendering detail. The priorities preferably are also used in resolving conflicts associated with plural objects contending for attention. In addition, the priorities preferably are also used to determine which objects should be sent over the network and at which level of quality. Via priorities, then, system resources can generally be used more efficiently. In any case, advantages of the priority-based rendering and data communication arrangement, according to the invention, include coordination of the priority and attention components.

The priorities preferably are used to provide rendering/communication in enhanced detail and/or quality for those objects that the participant (or developer) deems important. For example, an object with which a participant is engaged in an interaction session preferably has a high priority and, as such, may be rendered so that, as to one or more selected senses, the participant experiences enhanced manifestations of the object's features. In an exemplary sight-based attention space, the details typically include the object's features, expressions, gestures and other manifestations; as such, the enhancements are directed to one or more of resolution (e.g., numbers of polygons), enhanced animation, and increased frame rates. In an exemplary hearing-based attention space, the details typically include the object's voice(s), each such voice typically being speech, music or other articulation subject to being heard, alone or in combination, by the participant; as such, the enhancement is directed to one or more of volume, resolution, increased bandwidth, and reduced masking from other sounds (e.g., so that the voices are louder, clearer or otherwise distinguished from the voice's of other non-interacting objects).

In one embodiment, objects in a virtual environment comprise source objects and media objects. Source objects are objects with which a participant can interact, e.g. avatars, dogs, and TV sets. Media objects are objects that stimulate a participants' senses when rendered, e.g. animation, video, sound, text, and graphics. Typically, more than one media object is associated with a single source object. (Accordingly, a source object is sometimes referred to in this document as the source of the associated media objects.) As described further below, when a single attention space is used in the computation of priorities, the base priority of a media object preferably is determined by the relation of its source object with the attention space used in the computation.

Priority preferably is determined in connection with selected parameters. Exemplary parameters include one or more of (i) the position of an object relative to one or more of a participant's selected attention spaces, (ii) the direction, orientation and span of the selected sense and focus spaces, (iii) the participants' profiles, (iv) parameters explicitly set by a developer or participant for priority computation, (v) models of social interaction/cultural norms, and (vi) economic models, e.g., cost structures.

Of the selected parameters, one or more parameters preferably serve as base parameters, while the other parameters serve as modifying parameters. In such case, the priorities are first computed using the base parameters. The priorities are subject to modification based on computations using one or more of the modifying parameters. In the illustrative discussions that follow, the context is first person view and two base parameters are described: (a) one base parameter respects the relative distance between (i) the participant's avatar A and (ii) another object B resident in the attention space associated with avatar A and (b) another base parameter respects the angle between (i) the vector AB associated with the relative positions of objects A and B and (ii) an attention vector associated with A. Although these base parameters are preferred in this first person context, it is to be recognized that other base parameters can be selected, without departing from the principles of the invention. It is also to be recognized that the context can be other than first person view, without departing from the principles of the invention. In the context of in third person view, for example, (a) one base parameter can be selected to be the relative distance between (i) the immersion point of participant A and (ii) another object B resident in the attention space associated with A and (b) another base parameter can be selected to be the angle between (i) the vector AB associated with the relative positions of immersion point A and object B and (ii) an attention vector associated with A.

Priority-based rendering and data communication contemplates the employ of plural attention spaces, each such space being associated with a particular sense (e.g., sight, hearing or smell). Rendering and communication, in such case, is enabled to have separate priority structures for each sense. As an example, while sight preferably has associated priority structures respecting the base parameters of a vision space, hearing preferably has associated priority structures respecting base parameters of a hearing space, wherein the base parameters of the hearing space can be the same or different than those of the vision space.

Priority-based rendering and data communication also contemplates concurrent support of plural senses, each such sense having associated therewith one or more attention spaces. In such support, the media objects of a particular type and associated with a single source object preferably have a priority of value equivalent to the priority of the source object. As an example, it is preferred that priorities of graphics, video and image objects are computed as to a selected vision space and, if the objects' source is a single avatar, the priorities are equal to the priority of the avatar as to the selected vision space. As another example, it is preferred that priorities of sound stream objects are computed as to a selected hearing space and, if the objects' source is a single avatar, the priorities are equal to the priority of the avatar as to the selected hearing space.

1. Priority Computation Using Base Parameters

With the base parameters selected based on distance and angle as described above, the computation of priorities for each resident object B comprises (i) dividing A's applicable attention space 55 (see FIG. 1b) into regions and (ii) assigning a number to resident objects B based on the region in which each such object resides. The assignment preferably follows selected conditions, including: (a) a region disposed closer to A (e.g., closer to the vertex of A's attention cones) is assigned a higher priority than a region farther away and (b) a region disposed closer to A's attention vectors (e.g., vision vector AA") is assigned a higher priority than a region farther away. As an example, the disposition of a resident object B relative to A is measured by the distance |AB|, while its disposition relative to AA" is measured by angle β (angle BAA").

Referring to FIG. 1b, each supported attention space preferably is a sphere 57. So as to provide regions, the applicable attention space (or a selected portion thereof) is divided along two dimensions: (i) a radial dimension (R-dimension) related to the one or more radii of concentric spheres within the attention space's sphere 57 and (ii) an angular dimension (β-dimension) related to an angle β (angle BAA"). In each dimension, the attention space's sphere is selectably divided in either equal, substantially equal or unequal intervals. Moreover, in such divisions, the size of the regions preferably is controlled by selecting the value of the dividing interval(s) associated with each dimension. In that regard, smaller regions generally are provided by selecting relatively smaller values for the dividing interval(s). On the other hand, larger regions generally are provided by selecting relatively larger values for the dividing interval(s).

In establishing the regions, either integer or floating point operations can be used. It is understood that employing integer operations provides relatively less computational load while employing floating point operations provides relatively more precision.

Examples of division forms in the R- and β-dimensions include:

(a) for equal division in the R-dimension, the dividing radii are increased in equal increments (e.g., $i*R/n$, where $i=0, 1, 2 \ldots n$) from 0 to the radius R of a selected attention sphere (sometimes referred to hereafter as R-division);

(b) for unequal division in the R-dimension, the dividing radii are increased in unequal increments (e.g., based on $SQRT[i*R^2/n]$ where $i=0, 1, 2 \ldots n$) from 0 to the radius R of a selected attention sphere (sometimes referred to hereafter as $R^2$-division);

(c) for equal division in the β-dimension, the dividing cones' internal angles of rotation are increased in equal angular increments (e.g., $i*180°/n$, where $i=0, 1, 2 \ldots n$) from 0 to 180 degrees in sweeping out a selected attention sphere (sometimes referred to hereafter as β-division); and (d) for unequal division in the β-dimension, the dividing cones' internal angles of rotation are increased in unequal angular increments (e.g., based on $i*2/n$, where $i=0, 1, 2 \ldots n$) from 0 to 1 in sweeping out a selected attention sphere (sometimes referred to hereafter as cos β-division).

Other division forms can be employed without departing from the principles of the invention.

Choosing division forms for each dimension leads to various combinations. Of the possible combinations (including those based on division forms other than the examples), four are described below: (i) the combination of R-division and β-division; (ii) the combination of $R^2$-division and cos β-division; (iii) the combination of R-division and cos β-division; and (iv) the combination of $R^2$-division and β-division. It is understood that, for the senses of sight and hearing, the combination of $R^2$-division and cos βdivision generally approaches the behavior of the real world. It is also understood that division along only a single dimension can be used in the priority computation, without departing from the principles of the invention.

Each combination provides priority numbers to the objects in A's attention space. In so providing priority numbers, each combination preferably generates three base priority structures. A first structure contains priority numbers assigned in R-dimension, e.g., using R- or $R^2$-division. A second structure contains priority numbers assigned in the β-dimension, e.g., using β- or cos β-division. A third structure contains composite priority numbers from both dimensions. (A structure is a base priority structure if the priority numbers thereof are computed from only the base parameter. A structure is a modified priority structure if the priority numbers thereof are computed from the base parameter and one or more of the modifying parameters.)

The general form of a priority structure is $$\{\text{type-of-division } (A_i, P_i)^*\}$$

where $A_i$ is the ith object's identifier; $P_i$ is the priority number of $A_I$ using the division form indicated by type-of-division; and the '*' means zero or more pairs of $(A_i, P_i)$. Valid types-of-division include, for example, R, R2, B, C, RB, RC, R2C, and R2B, where R represents R-division, R2 represents $R^2$-division, B represents β-division, C represents cos β-division. The first four of the valid types-of-division indicate that priority numbers are generated by dividing the sense sphere along one dimension using only the indicated division form. The last four of the valid types-of-division indicate that composite priority numbers are generated by dividing the sense sphere along two dimensions using the indicated, corresponding divisions forms.

Preferably, the smaller the priority number the higher the rendering priority. However, it is understood that higher rendering priority can be associated with larger priority numbers. Generally, the priority numbers need not even be numbers; rather, any selected designation ranking priority in the attention space (e.g., by mapping the numbers $P_i$ in the priority structure to the selected ranking system) can be used without departing from the principles of the invention.

It is understood that developers can configure their respective systems as to priority computation. For example, developers can select (i) one of the above division forms, or other division forms, for computing priorities, (ii) all or a subset of the three priority structures and (iii) the parameters employed in implementing the combinations and priority structures, as well as the associated computations. The selected configuration generally is responsive to various factors, including, available system resources and specifics of the application domain (e.g., the assessed importance of each priority structure to controlling the rendering of objects of different media or of different aspects of the same media).

2. Modifying Priorities Using Other Parameters

As illustrated above, base parameters preferably are employed to establish one or more base priority structures, these priority structures relating a priority number to each respective object in the participant's applicable attention space. The priority numbers so computed preferably are subject to modification. The modification computations are based on one or more modifying parameters. One such modifying parameter is a participant's profile which profile comprises, in a general sense, one or more lists of data directed to the participant's categorical views and opinions. Examples of the lists that may be provided include; friends, pests, public figures, and interests. Other modifying parameters can relate to economics and to whether the participant is engaged in an interaction session. For example, if A and object B are engaged in an interaction session, B's rendering priority $P_B$ preferably is highest among all objects in the participant's attention space.

Applying Attention and Priority Components to Objects

As stated previously, the system's attention and priority components apply both to avatars and to non-avatar objects. This section provides additional examples and embodiments respecting non-avatar objects in the virtual environment.

1. Spontaneous Interaction with Objects

In addition to enabling spontaneous interaction with avatars, the mechanisms presented in this invention also enable a participant to interact spontaneously with non-avatar objects. That is, the system can be implemented to provide that a sufficiently sustained focus (e.g., gaze) respecting an object triggers one or more defined on-behavior(s) of the object. As an example, when a participant has gazed—whether in first or third person—at a door for sufficient time duration (e.g., a predetermined triggering period), the door opens and the objects behind the door are visible, provided the system supports this as the defined behavior of the door. If the object is a dog, it can bark and wag its tail happily. As another example, if a participant has gazed at a picture for sufficient time duration (e.g., a predetermined triggering period) and the picture is a link, the content (e.g., a web page) is fetched and displayed.

The system can also be implemented to provide that a break in focus (e.g., gaze) respecting an object triggers one or more defined off-behavior(s) of the object. As an example, a break in gaze can trigger the door to close, and the dog to bark in a sad tone and drop its tail.

The system can also be implemented to activate different behaviors based on different focus durations (sometimes referred to as "long-behavior"). As an example, if gaze at dog is sustained for a sufficiently long duration, the dog starts rolling and jumping.

The above operations can be implemented variously. Relying on previously defined symbols and a vision context, a gaze condition is expressed as: $C_{gao}=(|AO|<L_a)$ AND $(AO@u_a>|AO|*C_a)$, wherein A represents the participant's avatar (e.g., first person view) and O represents the object in consideration. For this gaze condition, the triggering of defined object behavior is given by the following exemplary logic:

```
if(S_a = B){
    while ((C_gao = TRUE) AND (Δt >T_g)) } {
        activate the on-behavior of O;
        if(Δt >10 *T_g) {
activate the long-behavior of O;
        }
    }
    while ((C_gao = FALSE) AND (Δt >T_g)) } {
        activate the off-behavior of O;
    }
}
```

In the logic, $S_a$ is A's current state, $T_g$ is gaze time tolerance, $|AO|$ is the distance between A and O, AO is the vector connecting A and O, and Δt is the time duration during which $C_{gao}$ holds the prevailing value. The other symbols are as previously defined.

In this example, the condition ($S_a$=B) ensures that only when the participant's avatar is in the base state (i.e., not engaged with any other avatars) is the avatar-object gaze checked, such that avatar-avatar gaze takes precedence over avatar-object gaze. It is to be recognized, however, that such condition can be omitted, supplemented with additional conditions or replaced by other conditions, without departing from the principles of the invention.

Also in this example, the long behavior is selected to be triggered by gaze duration of ten times that applicable to on behavior. It is to be recognized that the multiplier can be other than ten and, as well, can be selectably configured object-by-object, without departing from the principles of the invention.

If more than one object satisfies the gaze condition, priorities and/or rules preferably are used to determine which object gains the participant's attention. If priorities/rules fail to identify a single object for attention, other mechanisms preferably are supported. Such other mechanisms include, as examples, providing for random selection, enabling the participant to select among the objects, and supporting selection of multiple objects, as previously described.

2. Priorities for Non-avatar Objects

The priorities, as previously described, apply to non-avatar objects as well. The priorities of non-avatar objects, as with avatars, preferably are employed in 1) communicating the data associated with the objects over a network, 2) rendering objects, and 3) resolving conflicts among objects contending for attention. In addition to reducing rendering-based loading, the use of priorities can enhance immersion in the virtual environment. (If enhanced immersion is a primary goal, the R2C structure preferably is employed.)

3. Intruding Objects

As previously described, the system preferably is implemented to enable non-avatar objects to intrude on a participant's attention. The interaction control engine associated with FIG. 8 preferably treats this intrusion case as attention drift. For example, an application can allow the on-set of a loud sound and/or bright light to automatically turn a participant's gaze vector to point to the source object. If this intrusion makes false an existing gaze condition and the participant/avatar is in the interacting state, the participant/avatar transitions to the parting state. From the parting state, if the gaze of the participant/avatar fails to return to the interacting partner within an applicable time tolerance, the participant/avatar preferably transitions to the base state. If the gaze returns to the partner within the applicable time tolerance or the participant issues an Attention-Request or Attention-Grant to the partner, the participant/avatar preferably returns to the interacting state. If attention is grabbed when the participant/avatar is in a state other than base or interacting, the participant/avatar goes to the f-gazing state. From the f-gazing state, if the gaze returns or the participant issues an Attention-Grant or Attention-Request to the partner within the applicable time tolerance, the participant/avatar returns to the state from which it transitioned to the f-gazing state. If attention drift exceeds the time tolerance, the participant/avatar preferably goes to the base state. As in the real world, the participant decides what they want to do when an object has intruded.

If the system, as implemented, enables non-avatar objects to intrude on a participant/avatar's attention, the system preferably also provides mechanisms to resolve conflict between objects contending for intrusion, e.g., between the plural signal sources, each of which has the potential to cause an intrusion. As with similar conflicts (e.g., conflict among objects contending when the participant/avatar is not engaged), the system can employ priorities and/or rules to arbitrate among objects (whether avatar or non-avatar objects, or both). As an example, a signal with the highest intensity grabs the attention. As another example, a participant can choose to allow audio signals to grab their attention. As yet another example, a participant can choose to block signals from sources that are disliked; this blocking, however, can be subject to the system enabling information providers, such as an advertiser, to pay for degrading such blocking as to the provider's source(s). As yet one more example, the conflict can be resolved by random selection which mechanism can be implemented alone or in combination (i.e., a last-resort mechanism).

The system can also be implemented to provide that the Set-Priority control enables participants to choose to what degree they allow non-avatar objects to automatically grab their attention and which types of signals can trigger the grabbing event. The control can also be used to set the minimum threshold of signals for triggering the event (e.g., a high threshold effectively blocks the signal).

Other Senses

The system described above, including the attention and priority components, can be applied to other senses. This application is particularly the case with those senses that have similar characteristics as vision, e.g., auditory and olfactory senses. However, it is to be understood that such senses may be characterized by different ranges and different sensitivities, e.g., sensitivities to the direction of attention focus.

Each implemented sense preferably has at least one associated attention space. Each such space preferably is characterized by a sense sphere, sense cone, sense vector, focus sphere, focus cone, and focus vector. As with vision, the radius of a sense sphere preferably is adjusted to reflect a perception range of the applicable sense. The direction of a focus vector represents the center of the attention. The length of the focus vector represents the distance of the attention focus, and the focus cone's internal angle of rotation determines the breadth of attention focus. To illustrate, generally, a participant cannot perceive, when in first person view, signals of sources disposed outside a first person sense cone, which cone may fill part of or the entire sense sphere. Moreover, the participant has enhanced ability to perceive the signals of sources disposed within a focus cone of the participant, as compared to the signals of sources disposed outside any such cone.

In implementation, a system according to this invention can support attention and prioritization based on a plurality of senses. The computations as to each supported sense preferably are carried out independently. As an example, the system can be implemented to assign priorities to audio information sources using a sense space for auditory signals, while assigning priorities to animation and/or video using one or more vision spaces.

The Set-Attention control can be used, e.g., to set the radius for each sense/focus sphere, and the length and the angle for each sense/focus cone. It can also be used to choose attention spaces for use with each media type.

Text-based Communication

In conventional virtual environments using text-based communication between participants (e.g. text-based chat), it is typical for all participants in the vicinity of the "talking" avatar to receive each message issued. For example, if a first participant issues a message directed to a particular second participant, not only does the second participant receive the message, but also all other participants receive the message. This tends to cause difficulties in interpreting a message, as the message typically appears to be out of context. Sometimes, the messages are rolled away too quickly for comfortable reading. In such environments, participants typically include tags (e.g. the name and/or the avatar's alias of the intended recipient) for a conversation. (In the following discussion, the participant issuing a message is sometimes referred to as the "issuing participant" and the participant intended to receive such message is sometimes referred to as the "intended recipient".)

In this system, the system preferably extracts the name of the intended recipient (e.g., the intended recipient's avatar's alias) so as to identify for that recipient the messages intended therefor. As an example, this extraction can be implemented in the attention component.

In any case, once the intended recipient is identified, the system preferably performs operations as if the issuing participant has activated an Attention-Request control directed to the intended recipient. In turn, the intended recipient can elect whether or not to respond. If the intended recipient elects not to respond, the system preferably performs operations as if the intended recipient has activated a No-Attention-Grant control directed to the issuing participant. If the intended recipient elects to respond, the system preferably performs operations as if the intended recipient has activated an Attention-Grant control directed to the issuing participant. From this time on until the communication ends, the system treats the communication between them as interaction.

One exemplary implementation displays the subsequent messages from the issuing participant on the screen of the recipient in a manner selected to distinguish them from other messages being issued. As an example, the messages of the interaction session can be distinguished by (i) punctuation (e.g., bolding), colors, size, or font type, (ii) by an indicative leading beep or flash, (iii) by being computer-voiced, or (iv) by combinations of the above or other mechanisms. In addition, it is also preferred to enable the participants to elect to have their respective avatars be brought proximate to one another, e.g. to enable interaction in the sight-space.

Another exemplary implementation automatically sends the issuing participant and the intended recipient into a private chat room.

Attention shift can be detected when the tag of the message changes to a different name. The value of the time tolerance can be adjusted according to the needs of attention drift in text-based systems. For example, the time tolerance can be set to be small relative to time tolerances in other contexts. Using a small time tolerance, once the tag changes, interaction with the original partner ends and interaction with the partner indicated in the new tag starts (e.g., similar to a participant who changed the tag having issued Attention-Request to an intruder).

Participants' names and/or their avatar aliases may be mentioned in the middle of a conversational sentence, which mention typically is not intended to indicate a change of partners. To account for this situation, one exemplary implementation defines a specific syntax for tags. For example, a tag can be defined to be the first word of a message and is to be followed by a colon (':'). Other implementations can be used without departing from the principles of the invention.

2D Virtual Environment

Interaction in a two-dimensional (2D) virtual environment is a special case of the interaction in virtual environments of three or more dimensions. To illustrate, in a 2D virtual environment, the attention and priority components employ the projections of a focus cone and a focus vector in a two-dimensional (e.g., x-y) plane. The conditions and computations associated with interaction and priority computation, as previously described herein, apply in 2D cases as well, but with the components of the third dimension (e.g., z-axis) at 0.

It will be understood that various other changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A system enabling a virtual environment, the virtual environment supporting virtual objects, one such virtual object being an avatar of a participant, the system enabling the participant to interact with one or more virtual objects in an interaction session, the interaction session contemplating the participant using one or more human senses, the system comprising:

a participant sensing device, the participant sensing device enabling the participant's immersion into the virtual environment as to at least one human sense; and an attention component supporting the participant sensing device, the attention component enabling first and third person views and providing spontaneous interaction and intentional interaction from each such first and third person views;

wherein the attention component provides, as to a particular human sense, one or more sense spaces and one or more focus spaces, the sense spaces controlling the virtual objects that the participant can perceive for selected intentional interaction and the focus spaces determining the virtual objects that are candidates for spontaneous interaction, the sense and focus spaces each defining a three-dimensional region.

2. A system as claimed in claim 1, wherein the participant sensing device comprises a display device.

3. A system as claimed in claim 1, wherein the attention component provides sense spaces that determine which virtual objects the participant can perceive (a) in third person view, directly and (b) in first person view, through the participant's avatar.

4. A system as claimed in claim 1, wherein the attention component provides sense and focus spaces associated with one of the first and third person views.

5. A system as claimed in claim 1, wherein the attention component provides one sense space and one focus space, the sense space being associated with one of the first and third person views and the focus space being associated with the other of the first and third person views.

6. A system as claimed in claim 1, wherein the attention component provides one sense space and one focus space, the focus space being associated with first person view and the sense space being associated with third person view, and wherein the attention component provides an immersion point for the virtual environment at which the participant is immersed into the virtual environment in third person view, the sense space being associated with the immersion point.

7. A system as claimed in claim 6, wherein the attention component provides that the first and third person views operate concurrently, and the participant sensing device immerses the participant in the virtual environment through the sense space associated with third person view, so as to enable intentional interaction, while spontaneous interaction is enabled via the focus space associated with first person view.

8. A system as claimed in claim 6, wherein the attention component provides, as to the particular human sense, at least one of (a) an additional sense space, such additional sense space being associated with first person view and (b) an additional focus space, such additional focus space being associated with third person view.

9. A system as claimed in claim 8, wherein the attention component provides that the first and third person views operate concurrently, so that the participant sensing device immerses the participant in the virtual environment through at least one of the sense spaces for intentional interaction, while spontaneous interaction is enabled via one or more of the focus spaces.

10. A system as claimed in claim 9, wherein the attention component enables the participant to be immersed, at any one time, by the participant selecting one or more sense spaces from among the provided sense spaces, the selected sense spaces contributing to the attention component's support of the participant sensing device.

11. A system as claimed in claim 10, wherein the attention component enables immersion, in the case of selection of plural sense spaces, by at least one of (a) providing information from all such sense spaces to the participant at one time, (b) providing portions of information from all such sense spaces to the participant at one time, (c) providing information from selected sense spaces to the participant at different times, (d) providing portions of information from selected sense spaces to the participant at different times, and (e) providing information from one or more sense spaces to the participant via plural participant sensing devices.

12. A system as claimed in claim 1, wherein the attention component provides, as to an additional human sense, one or more additional sense spaces and one or more additional focus spaces, the additional sense spaces controlling the virtual objects that the participant can perceive for selected intentional interaction via that additional human sense, and the additional focus spaces determining which virtual objects are candidates for spontaneous interaction.

13. A system as claimed in claim 1, wherein the attention component enables the first and third person views as being independently configurable.

14. A system as claimed in claim 1, wherein the attention component enables first person view associated with one of spontaneous interaction and intentional interaction and third person view associated with the other of spontaneous interaction and intentional interaction.

15. A system as claimed in claim 14, wherein the attention component provides that the first and third person views operate concurrently.

16. A system as claimed in claim 14, wherein the attention component enables at least one of (a) first person view associated with the other of spontaneous interaction and intentional interaction and (b) third person view associated with the one of spontaneous interaction and intentional interaction.

17. A system as claimed in claim 16, wherein the attention component provides that the first and third person views operate concurrently, so that the participant sensing device immerses the participant in the virtual environment through at least one of the first and third person views for intentional interaction, while spontaneous interaction is enabled via at least one of the first and third person views.

* * * * *